United States Patent [19]
Tomabechi

[11] Patent Number: 6,026,358
[45] Date of Patent: Feb. 15, 2000

[54] NEURAL NETWORK, A METHOD OF LEARNING OF A NEURAL NETWORK AND PHONEME RECOGNITION APPARATUS UTILIZING A NEURAL NETWORK

[75] Inventor: Hideto Tomabechi, Tokushima, Japan

[73] Assignee: Justsystem Corporation, Tokyo, Japan

[21] Appl. No.: 08/576,585

[22] Filed: Dec. 21, 1995

[30] Foreign Application Priority Data

Dec. 22, 1994 [JP] Japan ........................................ 336135
Aug. 22, 1995 [JP] Japan ........................................ 236061

[51] Int. Cl.$^7$ ................................. G10L 5/04; G06E 1/00
[52] U.S. Cl. ........................... 704/232; 395/23; 704/249
[58] Field of Search ................................. 395/2.41, 2.31, 395/2.28, 2.32, 2.12, 2.58, 23, 24, 2.63; 704/232, 222, 219, 223, 203, 249

[56] References Cited

U.S. PATENT DOCUMENTS

| | | | |
|---|---|---|---|
| 5,175,793 | 12/1992 | Sakamoto et al. | 395/2.09 |
| 5,214,743 | 5/1993 | Asai et al. | 395/11 |
| 5,259,039 | 11/1993 | Akamatsu | 382/14 |
| 5,381,513 | 1/1995 | Tsuboka | 395/2.41 |
| 5,481,644 | 1/1996 | Inazumi | 395/2.41 |

OTHER PUBLICATIONS

Elman, Jeffery L., "Finding Structure in Time", *Cognitive Science*, 14, pp. 179–211, Apr.–Jun. 1990.

Fahlman Scott E., "Faster–Learning Variations on Back- –Propagation: An Empirical Study," published by Carnegie–Mellon University Computer Science Department, Nov. 1988.

Elman, Jeffery L. Structured Representations and Connectionist Models, published by University of California, San Diego Department of Cognitive Science (1989).

*Primary Examiner*—Richemond Dorvil
*Attorney, Agent, or Firm*—Greenblum & Bernstein P.L.C.

[57] ABSTRACT

A neuron device network is provided with a speech input layer, a context layer, a hidden layer, a speech output layer and a hypothesis layer. A phoneme to be learned is spectral-analyzed by an FFT unit and a vector row at a time point t is input to a speech input layer. Also, a vector state of the hidden layer at a time t−1 is input to the context layer, the vector row at a time t+1 is input to the speech output layer as an instructor signal, and a code row for hypothesizing the phoneme, or the code row, is input to the hypothesis layer. The time series relation of the vector rows and the phoneme are hypothetically learned. Alternatively, a spectrum, a cepstrum or a speech vector row based on outputs from the hidden layer of an auto-associative neural network is input to the speech input layer, and the code row is output from the hypothesis layer, taking into account the time series relation. The speech is recognized when a CPU reads the stored output values of the hidden layer and the connection weights of the hidden layer and the hypothesis layer from a memory of the neuron device network and calculates output values of the respective neuron devices of the hypothesis layer based on the output values and the connection weights. The corresponding phoneme is determined by collating the output values of the respective neuron devices of the hypothesis layer with the code rows in an instructor signal table.

19 Claims, 14 Drawing Sheets

FIG. 3

| Phoneme | Hy1 | Hy 2 | Hy 3 | Hy 4 | Hy 5 | Hy 6 | Hy 7 | Hy 8 |
|---|---|---|---|---|---|---|---|---|
| a | 1 | 0 | 0 | 0 | 0 | 0 | 0 | 0 |
| i | 0 | 1 | 0 | 0 | 0 | 0 | 0 | 0 |
| u | 0 | 0 | 1 | 0 | 0 | 0 | 0 | 0 |
| e | 0 | 0 | 0 | 1 | 0 | 0 | 0 | 0 |
| o | 0 | 0 | 0 | 0 | 1 | 0 | 0 | 0 |
| ⋮ | | | | | | | | |
| m | 0 | 0 | 0 | 0 | 0 | 0 | 0 | 1 |
| ⋮ | | | | | | | | |

FIG. 4

| CONNECTION WEIGHT TABLE | | HIDDEN LAYER | | | | | |
|---|---|---|---|---|---|---|---|
| | | Hi 1 | Hi 2 | Hi 3 | · · · · · | Hi 199 | Hi 200 |
| SPEECH INPUT LAYER | In 1 | WI11 | WI21 | | | | |
| | In 2 | WI12 | WI22 | | | | |
| | In 3 | WI13 | WI23 | | | | |
| | · | · | · | | | | |
| | · | · | · | | | | |
| | In 30 | | | | | | |
| CONTEXT LAYER | Co 1 | WC11 | WC21 | | | | |
| | Co 2 | WC12 | WC22 | | | | |
| | Co 3 | WC13 | WC23 | | | | |
| | · | · | · | | | | |
| | · | · | · | | | | |
| | Co 200 | | | | | | |
| SPEECH OUTPUT LAYER | Ou 1 | WO11 | WO21 | | | | |
| | Ou 2 | WO12 | WO22 | | | | |
| | Ou 3 | WO13 | WO23 | | | | |
| | · | · | · | | | | |
| | · | · | · | | | | |
| | Ou 30 | | | | | | |
| HYPOTHESIS LAYER | Hy 1 | WH11 | WH21 | | | | |
| | Hy 2 | WH12 | WH22 | | | | |
| | Hy 3 | WH13 | WH23 | | | | |
| | Hy 4 | WH14 | WH24 | | | | |
| | Hy 5 | WH15 | WH25 | | | | |
| | Hy 6 | WH16 | WH26 | | | | |
| | Hy 7 | WH17 | WH27 | | | | |
| | Hy 8 | WH18 | WH28 | | | | |

FIG. 6

| TIME | POWER | F1 | F2 | F3 | F4 | F5 | F6 | |
|---|---|---|---|---|---|---|---|---|
| t13 | | 203 | | | | | | |
| t12 | | 125 | 98 | 67 | | | | |
| t11 | | 112 | 86 | 62 | 89 | 109 | | |
| t10 | | 89 | 34 | 45 | 67 | 78 | 102 | |
| t9 | | 29 | 17 | 23 | 32 | 89 | 56 | |
| t8 | | 21 | 67 | 62 | 43 | 65 | 11 | |
| t7 | | 54 | 89 | 89 | 56 | 32 | 17 | |
| t6 | | 76 | 99 | 99 | 86 | 78 | 35 | |
| t5 | | 91 | 108 | 100 | 97 | 90 | 34 | |
| t4 | | 131 | 198 | 199 | 101 | 96 | 76 | |
| t3 | | 126 | 201 | 200 | 187 | 165 | 138 | |
| t2 | | 125 | 179 | 166 | 162 | 78 | 102 | |
| t1 | | 124 | 135 | 90 | 57 | 21 | 91 | |
| | | F1 | F2 | F3 | F4 | F5 | F6 | . . . . . . |

FREQUENCY

FIG. 7

| TIME | Hy 1 | Hy 2 | Hy 3 | Hy 4 | Hy 5 | Hy 6 | Hy 7 | Hy 8 | PHONEME |
|---|---|---|---|---|---|---|---|---|---|
| t1  | –    | – | – | –    | – | – | – | 0.70 | m |
| t2  | –    | – | – | –    | – | – | – | –    | ? |
| t3  | –    | – | – | –    | – | – | – | –    | ? |
| t4  | –    | – | – | –    | – | – | – | 0.82 | m |
| t5  | –    | – | – | –    | – | – | – | 0.81 | m |
| t6  | –    | – | – | –    | – | – | – | 0.93 | m |
| t7  | –    | – | – | –    | – | – | – | 0.92 | m |
| t8  | –    | – | – | –    | – | – | – | 0.95 | m |
| t9  | –    | – | – | –    | – | – | – | 0.95 | m |
| t10 | –    | – | – | –    | – | – | – | 0.96 | m |
| t11 | –    | – | – | –    | – | – | – | 0.91 | m |
| t12 | –    | – | – | –    | – | – | – | 0.86 | m |
| t13 | –    | – | – | –    | – | – | – | 0.70 | m |
| t14 | –    | – | – | –    | – | – | – | 0.73 | m |
| t15 | –    | – | – | –    | – | – | – | 0.77 | m |
| t16 | –    | – | – | –    | – | – | – | –    | ? |
| t17 | 0.80 | – | – | –    | – | – | – | –    | a |
| t18 | 0.88 | – | – | –    | – | – | – | –    | a |
| t19 | 0.88 | – | – | –    | – | – | – | –    | a |
| t20 | 0.81 | – | – | –    | – | – | – | –    | a |
| t21 | 0.89 | – | – | –    | – | – | – | –    | a |
| t22 | 0.91 | – | – | –    | – | – | – | –    | a |
| t23 | 0.82 | – | – | –    | – | – | – | –    | a |
| t24 | 0.81 | – | – | –    | – | – | – | –    | a |
| t25 | 0.82 | – | – | –    | – | – | – | –    | a |
| t26 | 0.84 | – | – | –    | – | – | – | –    | a |
| t27 | 0.81 | – | – | –    | – | – | – | –    | a |
| t28 | 0.82 | – | – | –    | – | – | – | –    | a |
| t29 | 0.77 | – | – | –    | – | – | – | –    | a |
| t30 | 0.90 | – | – | –    | – | – | – | –    | a |
| t31 | 0.82 | – | – | –    | – | – | – | –    | a |
| t32 | 0.66 | – | – | –    | – | – | – | –    | a |
| t33 | 0.73 | – | – | –    | – | – | – | –    | a |
| t34 | –    | – | – | –    | – | – | – | –    | ? |
| t35 | –    | – | – | 0.92 | – | – | – | –    | e |
| t36 | –    | – | – | –    | – | – | – | –    | ? |
| t37 | –    | – | – | 0.73 | – | – | – | –    | e |
| t38 | –    | – | – | 0.76 | – | – | – | –    | e |
| t39 | –    | – | – | 0.67 | – | – | – | –    | e |
| t40 | –    | – | – | 0.75 | – | – | – | –    | e |
| t41 | –    | – | – | 0.70 | – | – | – | –    | e |
| t42 | –    | – | – | –    | – | – | – | –    | e |
| t43 | –    | – | – | –    | – | – | – | 0.77 | m |

FIG. 14

INPUT DATA INSTRUCTOR SIGNAL COORDINATE TABLE

| INPUT LAYER AI | OUTPUT LAYER AO | OUTPUT St OF HIDDEN LAYER AH |
|---|---|---|
| あ1 | | |
| ア1 | あ1 | |
| A1 | | |
| あ1 | | |
| ア1 | ア1 | |
| A1 | | S1 |
| あ1 | | |
| ア1 | A1 | |
| A1 | | |
| あ2 | | |
| ア2 | あ2 | |
| A2 | | |
| あ2 | | |
| ア2 | ア2 | S2 |
| A2 | | |
| あ2 | | |
| ア2 | A2 | |
| A2 | | |
| あ3 | | |
| ア3 | あ3 | |
| A3 | | |
| ⋮ | ⋮ | S3 |

NEURAL NETWORK, A METHOD OF LEARNING OF A NEURAL NETWORK AND PHONEME RECOGNITION APPARATUS UTILIZING A NEURAL NETWORK

BACKGROUND OF THE INVENTION

1. Field of the Invention

The present invention relates to a method and apparatus for speech recognition using a neural network. More particularly, the present invention relates to a neural network, a learning method of the neural network, and a phoneme recognition apparatus using the neural network.

2. Background Information

Neural networks are a recent technology which mimics the information processing of human cerebral nerves, and have attracted much attention. The neural network is constituted by a neuron device network having a plurality of neuron devices for transmitting data, and a learning controller for controlling learning of the plurality of neuron devices. The neuron device network is generally made up on an input layer to which data are input, an output layer from which data are output based on the inputted data, and one or more hidden layers provided between the input and output layers. Each of the neuron devices provided within the respective layers of the neuron device network is connected with another neuron device with (i.e., through) a predetermined strength (connection weight), and an output signal varies in accordance with the values of the connection weights between the devices.

In the conventional neural network having the above-described hierarchic structure, a process called "learning" is carried out by changing the connection weight between the respective neuron devices by the learning controller.

Learning is performed by supplying analog or binary data (patterns) which correspond to a number of inputs/outputs of the input and output layers. If it is assumed that g1 to g6 are supplied as input data, then the output signals p1 to p3 are output from the output layer when g1 to g3 are received as learning patterns from the input layer. If the correct answers are received from the output signals based on the input signals g4 to g6, the signals g4 to g6 are generally referred to as instructor signals. Further, learning is performed by executing a correction process of the connection weights of the respective neuron devices for a plurality of learning patterns in order to minimize the margin of error of the output signals p1 to p3 based on the instructor signals g4 to g6, or until these two types of signals coincide with each other.

Specifically, a process for correcting the connection weights between the respective neuron devices in the neuron device network so that the output signals coincide with the instructor signals, is error back-propagation (often referred to as BP) which has been conventionally used.

In order to minimize the margin of error of the output values from the instructor values in the output layer, the error back-propagation is used to correct the connection weights of the respective neuron devices between all of the layers constituting the neural network. That is, the error in the output layer is determined as a product obtained from individual errors generated from the neuron devices in the respective hidden layers, and the connection weight and is corrected so that not only the error from the output layer, but also the error of the neuron devices in the respective hidden layers, which is a cause of the error from the output layer, are minimized. Thus, all errors are computed in accordance with each neuron device in both the output layer and the respective hidden layers.

According to error back-propagation processing, individual error values of the neuron devices in the output layer are given as initial conditions, and the processing is executed in the reverse order, namely, a first target of computation is an error value of each neuron device in an nth hidden layer, a second target is an error value of each neuron device in an (n−1)th hidden layer, and the last target is an error value of each neuron device in the first hidden layer. A correction value is calculated based on the thus-obtained error value for each neuron device and the current connection weight.

Learning is completed by repeating the above-described learning processing with respect to all of the learning patterns a predetermined number of times, or until the magnitude of error of the output signal from the instructor signal is below a predetermined value.

Typically, neural networks have been used in systems for pattern recognition, such as characters or graphics of various data, processes for analyzing or synthesizing voices, or prediction of occurrence of time series patterns of movement.

In the conventional neural network, however, these layers of the neuron device network have not been implemented in such a manner that learning can be effectively performed when carrying out speech recognition, character recognition or form recognition. Thus, in the case where the conventional neural network is used in, e.g., a speech recognition apparatus, an input spectrum is segmented to coincide with a size of the neural network. Therefore, it is difficult to apply the neural network to the recognition of a continuous stream of speech because the uttering speed and a length of each phoneme may vary greatly. At present, speech recognition is performed at each phoneme level after the phoneme is subjected to segment processing to match the size of the neural network.

In addition, the input spectrum must be adapted to coincide with an initial position of the speech recognition neural network. Therefore, it is impossible to perform the recognition of a continuous stream of speech when the start time of a phoneme is unpredictable.

Further, in the conventional neural network, each spectrum of the phoneme is individually processed during the speech recognition. However, since the state of a current phoneme is affected by the state of a phoneme which immediately precedes the current phoneme during continuous speech recognition, the previous phoneme information cannot be used in speech recognition of the current phoneme by the conventional neural network where each phoneme is individually requested, thus the conventional neural network is not suitable for continuous speech recognition.

SUMMARY OF THE INVENTION

In view of the foregoing, the present invention, through one or more of its various aspects, embodiments and/or specific features or subcomponents thereof, is thus provided, intended and designed to bring about one or more of the objects and advantages as specifically noted below.

It is therefore a first object of the present invention to provide a new learning method for a neural network for processing data in which a set of a plurality of vector rows represents a predefined pattern.

Further, a second object of the present invention is to provide a neural network having a processing architecture for data in which a plurality of vector rows represents a predefined pattern.

Furthermore, it is a third object of the present invention to provide a speech recognition apparatus capable of recognizing a continuous stream of speech in accordance with each phoneme or a word.

According to one aspect of the invention, a method of learning is provided which is characterized by the steps of inputting first vector rows representing data to a data input layer, inputting second vectors rows as a first instructor signal to a first output layer, and inputting a definite meaning as a second instructor signal to a second output layer. Learning is performed for the data by having a plurality of first vector rows represent the definite meaning.

According to another aspect of the present invention, a method of learning of a neural network is provided which is characterized by the steps of inputting output vector values of a hidden layer or a first output layer having a plurality of neuron devices, the plurality of neuron devices corresponding to first vector rows of a feedback input layer, the feedback input layer connected with the hidden layer and having a number of neuron devices equal to a number of neuron devices of the hidden layer, inputting second vector rows representing data to a data input layer, inputting third vector rows as a first instructor signal to a first output layer, and inputting a definite meaning as a second instructor signal to a second output layer. Learning is performed for the data by having a plurality of second vector rows representing the definite meaning.

Further, according to another aspect of the invention, there is provided a neural network comprising a neuron device network having a data input layer, a hidden layer connected to the data input layer, and an output layer connected to the hidden layer, the output layer comprising a first output layer and a second output layer, a learning device in the neuron device network for learning about data having a plurality of first vector rows representing a definite meaning, an inputting device for inputting the plurality of first vector rows to the data input layer of the neuron device network, and an outputting device for outputting output signals of the second output layer based on input of the plurality of first vector rows by the inputting device. The learning device inputs the plurality of first vector rows to the data input layer, inputs the second vector rows as a first instructor signal to the first output layer and inputs the definite meaning as a second instructor signal to the second output layer.

According to yet another aspect of the invention there is provided a neural network comprising a neuron device network comprising an input layer having a data input layer and a feedback input layer, a hidden layer connected to the input layer, and an output layer connected to the hidden layer, the output layer having a first output layer and a second output layer, an inputting device for inputting the plurality of first vector rows to the data input layer of the neuron device network such that the learning device performs the learning, and an outputting device for outputting output signals of the second output layer based on input of the plurality of first vector rows by the inputting device. Also provided is a learning device in the neuron device network for learning about data having a plurality of first vector rows representing a definite meaning by inputting a plurality of second vector values of the hidden layer or the first output layer, to the input layer, inputting the plurality of first vector rows to the data input layer of the input layer, inputting a plurality of third vector rows as a first instructor signal to the first output layer, and inputting the definite meaning as a second instructor signal to the second output layer.

According to yet another aspect of the present invention, there is provided a speech recognition apparatus comprising a neural network, a speech inputting device for inputting speech, an analyzing device for analyzing in a time-series, vector rows representing characteristics of the speech input by the speech inputting device, a vector row inputting device for successively inputting the vector rows analyzed by the analyzing device to a data input layer of the neural network, and a phoneme specifying device for specifying a phoneme in accordance with outputs of an output layer of the neural network by successively inputting the vector rows to the data input layer by the vector row inputting device.

Further, the analyzing device may use spectral data or cepstrum data of the inputted speech, or output value data of a hidden layer of an auto-associative neural network as the vector rows representing a quantity of characteristics of the speech.

The above-listed and other objects, features and advantages will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the several views of the drawings, and wherein:

FIG. 3 is an explanatory view showing a content of a second instructor signal table with respect to the neuron device network;

FIG. 4 is a chart showing a connection weight table between respective neuron devices of the neuron device network;

FIG. 6 is an explanatory view showing vector rows pertaining to the speech which has been subjected to spectral analysis by an FFT unit of the speech recognition apparatus;

FIG. 7 is a chart showing a distribution of each phoneme of a word "mae" specified by the speech recognition apparatus;

FIG. 14 is an explanatory view showing a relation among input data, instructor signals and output data when the auto-associative neural network is learning according to the third embodiment.

DESCRIPTION OF THE PREFERRED EMBODIMENTS

Detailed description will now be given with regard to a neural network, a learning method for the neural network and a speech recognition apparatus using the neural network according to the features of a first embodiment of the present invention with reference to FIGS. 1–8.

Figure 1:
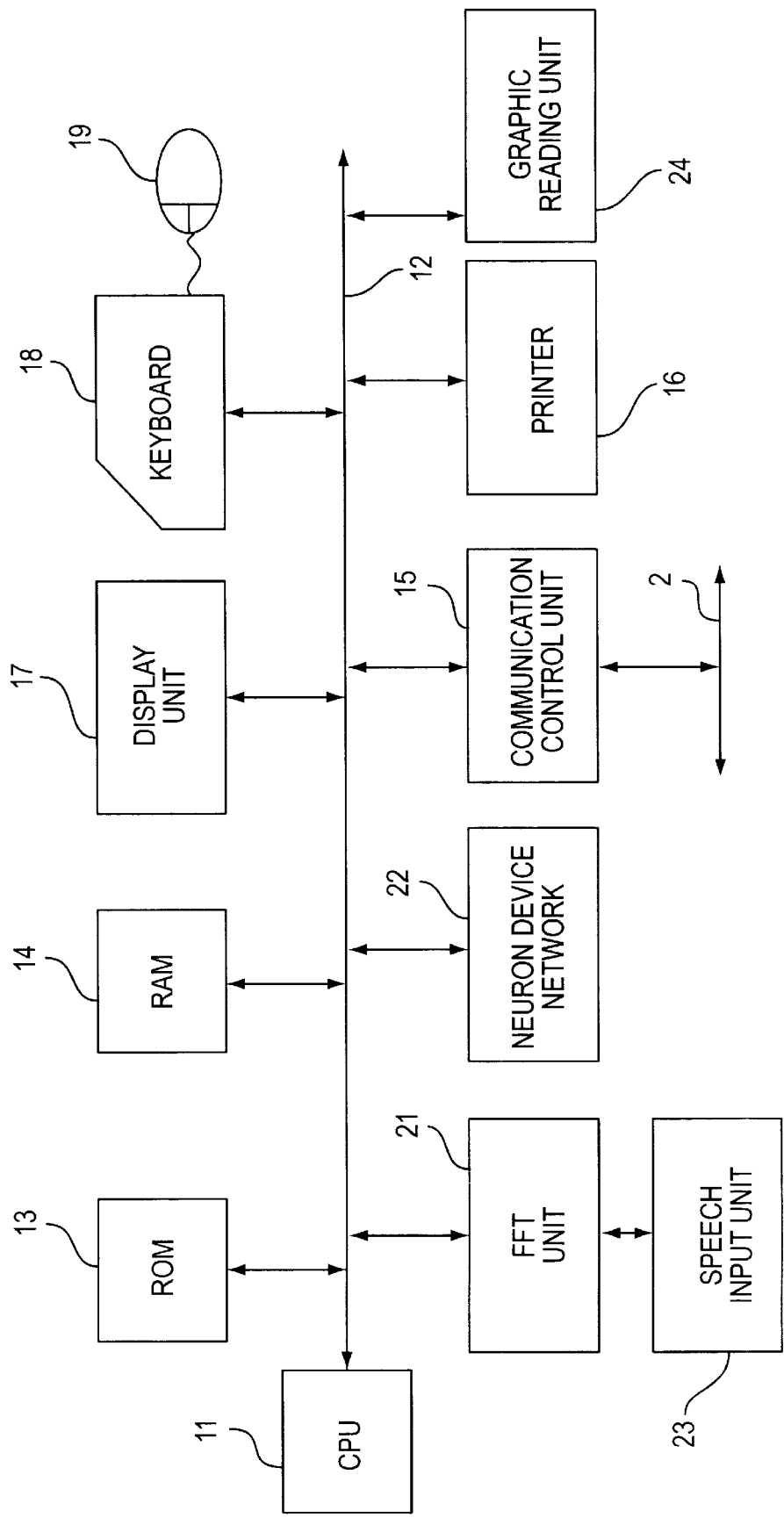
FIG. 1 is a schematic block diagram showing a speech recognition apparatus using a neutral network according to an embodiment of the present invention.

FIG. 1 illustrates in block diagram fashion, the system structure of a speech recognition apparatus using a neural network according to a first embodiment of the present invention.

The speech recognition apparatus is provided with a CPU 11 for performing the functions of inputting vector rows and instructor signals (vector rows) to an output layer for the learning process of a neuron device network 22, and changing connection weights between respective neuron devices based on the learning process. The CPU 11 first performs various processing and controlling functions, such as speech recognition based on the output signals from the neuron device network 22. The CPU 11 is connected to a read-only memory (ROM) 13, a random-access memory (RAM) 14, a communication control unit 15, a printer 16, a display unit 17, a keyboard 18, an FFT (fast Fourier transform) unit 21, a neuron device network 22 and a graphic reading unit 24 through a bus line 12 such as a data bus line. The bus line 12 may be an ISA, EISA, or PCI bus, for example.

The ROM 13 is a read-only memory storing various programs or data used by the CPU 11 for performing processing or controlling the learning process, and speech recognition of the neuron device network 22. The ROM 13 stores programs for carrying out the learning process according to error back-propagation for the neuron device network or code rows concerning, for example, 80 kinds of phonemes for performing speech recognition. The code rows concerning the phonemes are used as second instructor signals and for recognizing phonemes from output signals of the neuron device network. Also, the ROM 13 stores programs of a transformation system for recognizing speech from recognized phonemes and transforming the recognized speech into a writing (i.e., written form) represented by characters.

A predetermined program stored in the ROM 13 is downloaded and stored in the RAM 14. The RAM 14 is a random access memory used as a working memory of the CPU 11. In the RAM 14, a vector row storing area is provided for temporarily storing a power obtained at each point in time for each frequency of the speech signal analyzed by the FFT unit 21. A value of the power for each frequency serves as a vector row input to a first input portion of the neuron device network 22.

Further, in the case where characters or graphics are recognized in the neural network, the image data read by the graphic reading unit 24 are stored in the RAM 14.

The communication control unit 15 transmits and/or receives various data such as recognized speech data to and/or from another communication control unit through a communication network 2 such as a telephone line network, an ISDN line, a LAN, or a personal computer communication network.

The printer 16 can be provided with a laser printer, a bubble-type printer, a dot matrix printer, or the like, and prints contents of input data or the recognized speech.

The display unit 17 includes an image display portion such as a CRT display or a liquid crystal display, and a display control portion. The display unit 17 displays the contents of the input data or the recognized speech as well as a direction of an operation required for speech recognition.

The keyboard 18 is an input unit for varying operating parameters or inputting setting conditions of the FFT unit 21, or for inputting sentences. The keyboard 18 is provided with a ten-key numeric pad for inputting numerical figures, character keys for inputting characters, and function keys for performing various functions. A mouse 19 is connected to the keyboard 18 and serves as a pointing device.

A speech input unit 23, such as a microphone is connected to the FFT unit 21. The FFT unit 21 transforms analog speech data input from the voice input unit 23 into digital data and carries out spectral analysis of the digital data by discrete Fourier transformation. By performing a spectral analysis using the FFT unit 21, the vector row based on the powers of the respective frequencies are output at predetermined intervals of time. The FFT unit 21 performs an analysis of time-series vector rows which represent characteristics of the inputted speech. The vector rows output by the FFT 21 are stored in the vector row storing area in the RAM 14.

The graphic reading unit 24, provided with devices such as a CCD (Charged Coupled Device), is used for reading images such as characters or graphics recorded on paper or the like. The image data read by the image reading unit 24 are stored in the RAM 14.

Figure 2:
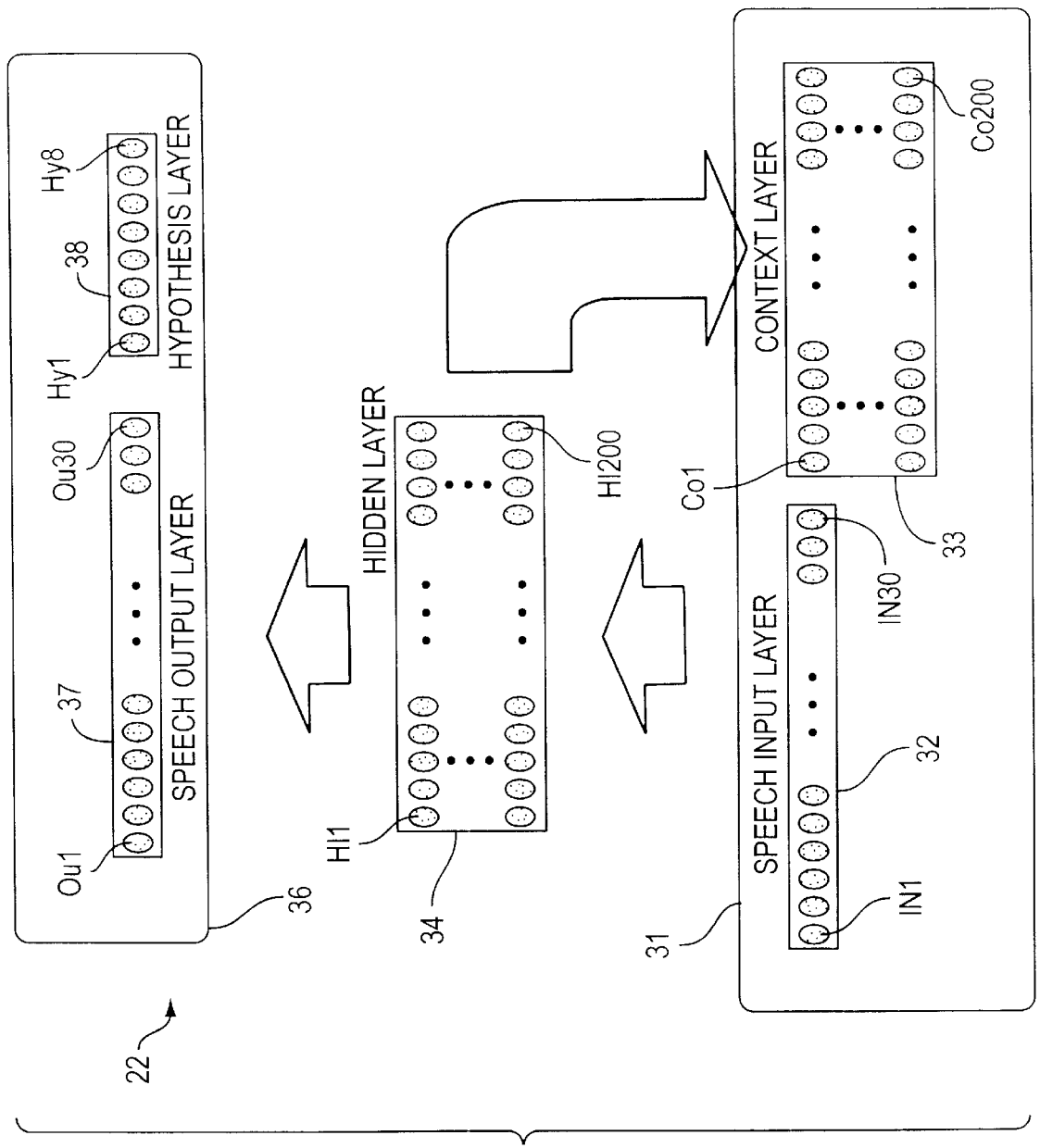
FIG. 2 is a diagram showing the structure of a neuron device network of the speech recognition apparatus.

FIG. 2 shows the structure of the neuron device network 22 of FIG. 1.

As shown in FIG. 2, the neuron device network 22 comprises three groups consisting of five layers. That is, a first group is an input layer 31 having a speech input layer 32 functioning as a data input layer and a context layer 33 functioning as a feedback input layer. A second group has a hidden layer 34. A third group is an output layer 36 having a speech output layer 37 functioning as a first output layer and a hypothesis layer 38 functioning as a second output layer.

The neuron device network 22 has a memory (not shown) for storing values of respective neuron devices constituting the input layer 31, the hidden layer 34 and the output layer 36.

In the speech recognition apparatus according to the first embodiment, the speech input layer 32 has 30 neuron devices In1 to In30. Further, the hidden layer 34 has 200 neuron devices Hi1 to Hi200. The context layer 33 has 200 neuron devices Co1 to Co200, which is the same number of devices as that of the hidden layer 34. The speech output layer 37 has 30 neuron devices Ou1 to Ou30, which is the same number of devices as that of the speech input layer 32. The hypothesis layer 38 has eight neuron devices Hy1 to Hy8.

The hypothesis layer 38 has eight neuron devices because in this example the 80 phonemes to be recognized can be effectively encoded with eight neuron devices. The spoken or written language to be recognized will determine a number of phonemes and a number of neuron devices required for encoding the number of phonemes. Further, a number of phonemes in Japanese, the language of the present example, is not necessarily restricted to 80, and any number of phonemes and neuron devices may be used.

In addition, the hypothesis layer 38 may be provided with the same number of the neuron devices as the number of phonemes. In other words, if a number of phonemes is 80, the hypothesis layer 38 may be provided with 80 neuron devices Hy1 to Hy80 in accordance with the respective phonemes. In regard to second instructor signals provided to the hypothesis layer 38 by the input layer 32, only one bit (neuron device) corresponding with each phoneme is "1" and each of other bits is "0". For example, as illustrated in FIG. 3, the signal "100000 . . . 0" is obtained for the phoneme "a" and the signal "010000 . . . 0" is obtained for the phoneme "i". By doing so, CPU processing burden associated with the learning process is increased, but a given phoneme can be more easily distinguished from other phonemes in speech recognition carried out after learning.

The input layer 31, the hidden layer 34 and the output layer 36 of the neuron device network 22 are capable of forward-propagation activation and back-propagation learning. A complete connection is made between the input layer 31 and the hidden layer 34, and between the hidden layer 34 and the output layer 36. That is, all the neuron devices of the input layer 31 are connected with all the neuron devices of the hidden layer 34, and all the neuron devices of the hidden layer 34 are connected with all the neuron devices of the output layer 56.

Further, during the process of learning in the neuron device network, vector rows of speech at a time t which have been subjected to spectral analysis by the FFT unit 21 are sequentially input to the speech input layer 32. At time t, the context layer 33 receives vector states of the neuron devices Hi1 to Hi200 of the hidden layer 34 obtained upon completion of learning at time t−1 prior to time t. The vector rows obtained at time t+1, which are to be supplied to the speech input layer 32 subsequently, are input to the speech output layer 37 as first instructor signals.

The second instructor signals are input to the hypothesis layer 38 as code rows for hypothesizing a definite meaning A (for example, a phoneme which should be recognized) represented by the vector rows input to the voice input layer 32 at times before and after time t.

In this manner, according to the present embodiment, the vector row at the current time (time t) is input to the speech input layer 32; the vector value at the past time (time t−1) in the hidden layer 34 is input to the context layer 33; and the vector row at the future time (time t+1) is input to the speech output layer 37. Therefore, the time series relation of the vector rows is learned in accordance with each power P (at time tn) which has been subjected to spectral analysis for each phoneme. That is, each connection weight of the speech input layer 32, the hidden layer 34 and the speech output layer 37 is learned as a value which includes the time series relation from the past (t−1), the present (t) and the future (t+1).

Further, each power P (at time tn) concerning the same phoneme is input to the speech input layer 32 for learning, as the same second instructor signal is input to the hypothesis layer 38. Consequently, the time series relation of the input vector rows and the phonemes (code rows) having this relationship are also hypothetically learned.

Therefore, in case of speech recognition, when the vector row related to speech which has been subjected to spectral analysis is input to the speech input layer 32, the vector rows are output from the hypothesis layer 38 taking into account the time series relation of the vector row.

FIG. 3 shows the contents of the second instructor signal table.

As shown in FIG. 3, the second instructor signal is designated by a code row consisting of 8 bits in such a manner that a phoneme "a" corresponds to "10000000"; a phoneme "i", "01000000"; and a phoneme "u", "00100000".

Each bit of the code represented by the second instructor signal is supplied to the respective neuron devices Hy1 to Hy8 of the hypothesis layer 38. The second instructor signal for each phoneme is stored in the ROM 13.

Note that each code row of the second instructor signal illustrated in FIG. 3 is shown as an example in the present embodiment, and any other code row may be similarly used. Further, although a number of neuron devices of the hypothesis layer 38 is determined in accordance with a number of phonemes, the code row may be represented by a number of bits corresponding with a number of neuron devices.

FIG. 4 illustrates a connection weight table for storing the connection weights between the respective neuron devices in such a neuron device network 22. As illustrated in the figure, the connection weight between each of the neuron devices of the hidden layer 34 and neuron devices of the speech input layer 32, the context layer 33, the speech output layer 37, and the hypothesis layer 38, respectively, is specified in the table. For example, the connection weight between neuron device Hi1 of the hidden layer 34 and neuron device Ou2 of the speech output layer 37 is WO12.

The neuron device network 22 is provided with a memory (not shown) for storing the connection weights. Further, a learning function of the neuron device network shown in FIG. 2 is carried out by the CPU 11 by varying the connection weights in this table in accordance with a predetermined error back-propagation method.

The operation of the first embodiment of the present invention will now be described.

A Learning Function of the Neural Network

When the learning process of the neural network is carried out, a user first specifies a learning mode by an operation of the keyboard 18 or checking check boxes or icons displayed on the display unit 17 using the mouse 19.

After specifying the learning mode, the user sequentially inputs characters corresponding to the predetermined 80 phonemes from the keyboard 18, and then inputs the sounds associated with each of the phonemes to the speech input apparatus 23. Note that the individual phonemes to be input and uttered by the user may be sequentially displayed on the display unit 17.

Figure 5A:
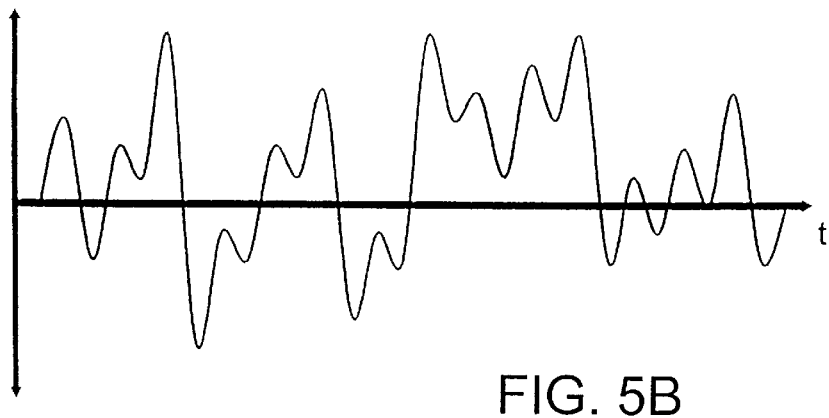
FIGS. 5A and 5B show the relationship of the input analog voice and the converted character string voice data in accordance with an aspect of the voice transmission apparatus.

Referring to FIG. 5A, upon inputting an analog signal pattern for, e.g., a phoneme "a", the speech input unit 23 supplies the analog signal to the FFT unit 21. The FFT unit 21 samples the supplied analog speech data at 22 kHz and A/D-converts the data into Pulse Code Modulation (PCM) data consisting of 16 bits. The obtained PCM data are then stored in a memory (not shown) in the FFT unit 21.

Figure 5B:
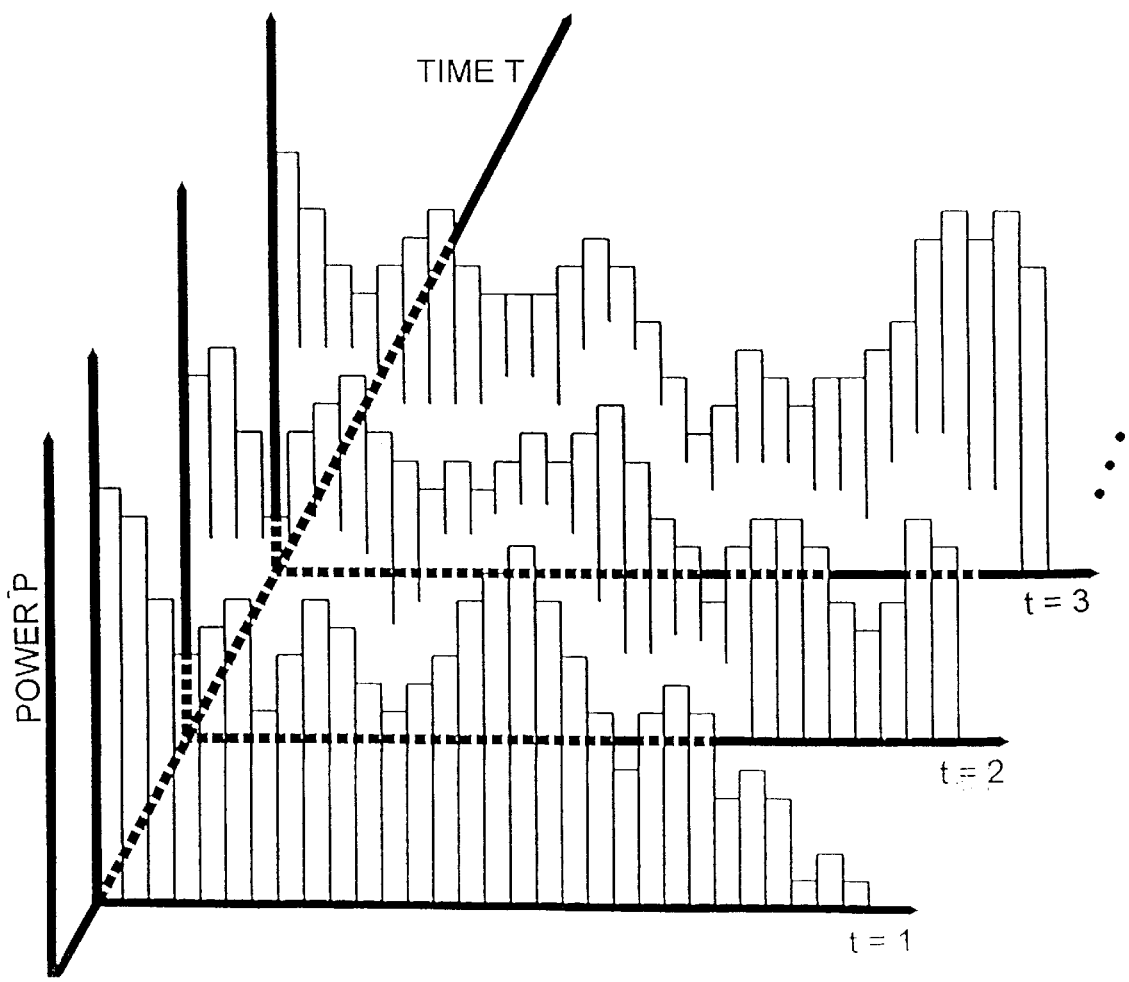

Subsequently, in the FFT unit 21, the digital speech data "a" are subjected to spectral analysis by the fast Fourier transform (FFT) processing at each time tn (n=1, 2, . . . , n) in accordance with time windows such as a square window, a Hamming window and a Hanning window and parameters such as a number of points. As shown in FIG. 5B, the FFT unit 21 calculates the power P (at time tn) with respect to each frequency (F1 to F30) of the speech data at time tn. As shown in FIG. 6, the vector row constituted by the power P (at time tn) with respect to each frequency is stored in the vector row storing area in the RAM 14 for each time tn.

When spectral analysis of the input phoneme by the FFT unit 21 is completed, the CPU 11 executes the learning process of the neuron device network 22 in accordance with the vector rows stored in the RAM 14.

A description will now be given of the learning process referring to the example phoneme "a" at time tn. In this example, the CPU 11 first inputs to the neuron devices Co1 to Co200 of the context layer 33 and the states of the neuron devices Hi1 to Hi2000 of the hidden layer 34 at time tn before starting the learning process, i.e., the vector row in the hidden layer at the time point when the learning at time tn−1 is completed.

The CPU 11 then reads from the RAM 14 the vector row P(tn) associated with the phoneme "a" at time tn and inputs the vector row P(tn) to each neuron devices In1 to In30 of the speech input layer 32. Each of the neuron devices In1 to In30 is provided for each of the frequencies F1 to F30 outputted by the FFT unit 21.

Further, the vector row P(tn+1) at time tn+1 following the time tn is input as the first instructor signal to the neuron devices Ou1 to Ou30 of the speech output layer 37. The code row "10000000" illustrated in FIG. 3 of the input phoneme "a" is also input as the second instructor signal to the respective neuron devices Hy1 to Hy8 of the hypothesis layer 38.

Upon completing the input of the vector row to the input layer 31 and input of the first instructor signal to the output layer 36, the CPU 11 continues the learning process by using the current connection weights between the respective neuron devices of the input layer 31, the hidden layer 34 and the output layer 36, and then updates each connection weight after learning.

Note that learning is carried out in accordance with the error back-propagation of the present invention. An example of a learning expression is $\Delta w(t)=[S(t)/[S(t-1)-S(t)]] \times \Delta w(t-1)$, and details of the learning expression and the learning algorithm are described in Technical Report #CMU-CS-88-162 "An Empirical Study of Learning Speed in Backpropagation Networks" by S. Fahlman, issued in September 1988, Carnegie Mellon University, which is expressly incorporated herein by reference in its entirety.

Further, learning may be carried out by applying back-propagation of a feed forward network to a discrete-time recurrent network as described in "Finding Structure in Time" by J. L. Elman, Cognitive Science, 14, pp. 179–211 (1990), which is expressly incorporated herein by reference in its entirety.

Furthermore, learning is not restricted to the above-described methods, and it may be performed in accordance with other methods similar to those noted above.

When learning about the phoneme "a" at time t is completed, learning at the time t+1 is carried out. In this case, the vector row of the hidden layer 34 for the time when the learning at time tn is completed is input to the context layer 33. Similar to learning at the time tn, the vector row P(tn+1) at the time tn+1 is read from the RAM 14 to be input to the speech input layer 32. In addition, the vector row P(tn+2) at time tn+2 is input as the first instructor signal to the speech output layer 37.

The hypothesis layer 38 continues to receive the same code "10000000" associated with "a" as the second instructor signal while the learning process about the input phoneme "a" is carried out.

When the learning process at time t+1 is completed and the connection weight values shown in FIG. 4 are updated, learning about the phoneme "a" is completed by performing the learning process with regard to all of the vector rows which have been subjected to spectral analysis.

The learning process with regard to all the phonemes such as "i", "u", "e", "o" and others is similarly carried out as described above.

Recognition of an Input Speech

With regard to this example, it is assumed that a sound, e.g., "mae," is input from the speech input unit 23 after the above-mentioned learning process is completed. Spectral analysis of the input sound is then performed in the FFT unit 21.

The CPU 11 subsequently inputs the vector row of the hidden layer 34 at time tn−1 to the context layer 33 and thereafter inputs to the speech input layer 32 a vector P(tn) which consists of the power with respect to each frequency at current time tn. The CPU 11 reads the respective connection weights (FIG. 4) between the input layer 31 and the hidden layer 34 from the memory of the neuron device network 22 and calculates output values of the respective neuron devices Hi1 to Hi200 of the hidden layer 34 based on the respective connection weights and input values of the input layer 31. The output values are stored in a memory (not shown) of the neuron device network 22. The vector values of the hidden layer 34 are input to the context layer 33 which relate to the vector row P(tn+1) at a time following time tn.

The CPU 11 then reads the stored output values of the hidden layer 34 and the connection weights of the hidden layer 34 and the hypothesis layer 38 from the memory of the neuron device network 22 and calculates output values of the respective neuron devices Hy1 to Hy8 of the hypothesis layer 38 based on the output values and the connection weights. The corresponding phoneme is determined by collating the output values of the respective neuron devices Hy1 to Hy8 with the code rows in the second instructor signal table stored in the ROM 13. The determined phoneme is stored in the RAM 14.

Since the phoneme is specified each time the vector row P(tn) is input to the speech input unit 32 in a time series, a plurality of phoneme rows are generated. For example, if a sound "iro" is input, "iiiiirrrooooo" is obtained. Therefore, the CPU 11 recognizes the input sound as "iro" based on the phoneme rows stored in the RAM 14.

When an input command is issued from the keyboard 18, the CPU 11 then transforms the recognized sound into a writing represented by characters in accordance with the transformation system such as the Japanese transformation system described above. Although the present invention is described as recognizing spoken and written Japanese, the present invention can be adapted to recognize any language. The transformed writing is displayed on the display unit 17 and simultaneously stored in the RAM 14. Further, in response to commands from the keyboard 18, the data are transmitted to various communication control units such as a personal computer or a word processor through the communication control unit 15 and the communication network 2.

FIG. 7 illustrates a result of the recognition of each phoneme in the sound "mae". Additionally, during the learning process, the vector rows shown in FIG. 7 are adopted as codes for respective phonemes input as the second instructor signal to the hypothesis layer 38. Further, the outputs of the respective neuron devices Hy1 to Hy8 are supplied as second output signals if these outputs exceed a predetermined threshold value. The outputs of the respective neuron devices Hy1 to Hy8 are not supplied if they are below the threshold value. This condition is represented by a reference character "−".

As illustrated in the right-most column of FIG. 7, phonemes "m", "a" and "e" can be determined as having a correspondence with input of the vector rows at each time tn. The input sound is recognized as "mae" from these phonemes.

As shown in FIG. 7, the sound is specified from the respective phoneme rows by the outputs from the neuron devices Hy1 to Hy8 at each time tn. If a plurality of identical phonemes, e.g., four or more identical phonemes are continuously specified, these phonemes are judged to be effective and speech recognition is carried out. For example, as shown in FIG. 7, the phoneme "m" specified at time t1 and the phoneme "e" specified at time t35 are not obtained for at least three consecutive times thereafter, therefore they are excluded from a target of speech recognition.

The phoneme may be judged to be effective when that phoneme is continuously specified not only four times or more, but also two, three, five, ten or any other number of times. Further, a number for judging that phoneme as effective may be specified by a user based on an input from the keyboard.

As shown by the character "?" in the right-most column in FIG. 7, when performing speech recognition, the phoneme sometimes cannot be determined during an initial stage when the vector rows which have been subjected to spectral analysis are input, or when shifting from one phoneme to another phoneme. However, the speech can be easily recognized by the phonemes which are thereafter continuously specified as shown in the figure.

Also, the phonemes sometimes cannot be determined at the first stage where the vector rows which have been subjected to spectral analysis are input because it may be considered that the learning process is insufficient or incomplete. When performing the learning process, the relation of time series of the past, the present and the future are factored into the learning. However, during the first state, the information related to the time series of the past is insufficient or does not exist. Therefore the learning process for determining phonemes cannot be performed due to the missing information.

Further, the phonemes cannot be specified when shifting from one phoneme to another phoneme, because it may be determined by the CPU 11 that the learning process takes place with respect to the individual phonemes, and the time series relationship of the respective phonemes are not the present target of the learning process.

According to this embodiment, since learning is carried out by taking the time series relation of the spectra of the respective phonemes into consideration, a voice of one speaker uttering phonemes for learning, and that of another speaker can be correctly recognized. Therefore, speaker-independent recognition is possible.

Further, determining a starting point of a particular phoneme to be recognized has been a problem when performing speech recognition in prior systems, but according to the embodiment of the present invention, a starting point of the phoneme does not have to be specified.

Furthermore, when executing continuous speech recognition in accordance with each phoneme, speech can be recognized irrespective of the uttering time of each phoneme, which may vary greatly from speaker to speaker. For example, when pronouncing a word "haru" with a sound "ha" being prolonged, only a plurality of phonemes "a" are specified like "hhhh . . . aaaaaaaaaa . . . rrrr . . . uuuuu . . .", and the word "haru" can be easily recognized.

Moreover, according to the first embodiment, a plurality of vector rows P(tn) at multiple time points tn are input for each phoneme, and the phoneme is specified at each time point. Because the state of each phoneme is affected by the state of the previous phoneme in continuous speech recognition, the phonemes can be distinguished when shifting from one phoneme to another phoneme. In other words, by the output of the symbol "?" (in the right-most column in FIG. 7) successive phonemes can be distinguished. Thereafter, the same phonemes are continuously specified, and the speech can be easily recognized even during continuous speech recognition.

In the embodiment described above, since a recurrent type neutral network is adopted, the vector values in the hidden layer 34 are fed back as inputs to the context layer 33. However, the present invention, is not restricted to this configuration and, for example, the vector values in the speech output layer 37 may be fed back to the context layer 33. In this case, a number of neuron devices Co in the context layer 33 must be equal to a number of neuron devices Ou in the speech output layer 37. If the vector values fed back as inputs to the context layer 34 are not above the threshold values shown in FIG. 7, the output values of the respective neuron devices in the speech output layer 37 are used as the vector values.

In addition, in the embodiment mentioned above, although a recurrent type neutral network is employed, a neuron device network without a context layer may be used in the present invention. In this case, the vector row at time t is input to the speech input layer 32; the vector row at next time t+1 input as the first instructor signal to the speech output layer 37; and a definite meaning represented by a set of time points tn is input as the second instructor signal to the hypothesis layer 38.

If there is no context layer, the time series relation based on the information of the past (time t−1) is not learned. However, since the time series relation based on the present (time t) and the future (time t+1) is locally learned, the speech can be sufficiently recognized. In this case, the processing necessary for learning and speech recognition is reduced and the speed of processing can be improved.

Further, in this embodiment, although speech recognition is effected by hypothetically learning both the time series relation of the vector rows to be input and the phonemes (code rows), the target of learning is not restricted to the phonemes having the time series relation in the present invention. The invention may be used in learning, recognition and prediction of a definite meaning represented by a set of plurality of vector rows Fn (n=1, 2, 3, . . . ) having a predetermined relationship.

For example, learning and prediction of occurrence of time series patterns of movements, as well as speech recognition, may be carried out.

Furthermore, it may be possible to perform learning and recognition of a specific meaning represented by a set of a plurality of vector rows having a spatial relation or a frequency relation as well as the time series relation. For instance, characters may be recognized by learning the spatial relation that the characters have.

Moreover, the embodiment has been described as to speech recognition according to each phoneme, but speech recognition may be effected in accordance with each word. In this case, the code row representing a word is used as the second instructor signal for a definite meaning represented by the vector row.

In addition, although learning of the neuron device network 22 is carried out by the CPU 11 in accordance with the learning program stored in the ROM 13, and speech is recognized by the neuron device network 22 after learning in this embodiment, speaker-independent recognition of a continuous stream of speech is possible with a high recognition rate, thus re-learning for an individual speaker is unnecessary. Thus, the speech recognition apparatus does not have to be provided with a learning function, and may use a neuron device network consisting of the context layer 33, the hidden layer 34 and the hypothesis layer 38 having connection weights determined by a learning process of another apparatus. In this case, the neuron device network 22 may be implemented using hardware having connection weights which have been previously learned.

Further, although each phoneme during learning, and speech during speech recognition are subjected to spectral analysis in accordance with the fast Fourier transformation in the FFT unit in the embodiment described above, spectral analysis may be carried out in accordance with any other algorithm. For example, spectral analysis may be performed in accordance with DCT (discrete cosine transformation) or the like.

Furthermore, the above embodiment has been described where only one kind of learning is effected with respect to, for example, a phoneme "a" which is a vowel, but various kinds of learning may be enabled in the present invention. For instance, in case of a phoneme "a", learning about "a" taken out from (i.e., as used in) each sound "ma", "na" or "ka", as well as an independent vowel "a", may be performed. In addition, in case of a consonant, e.g., "m", phoneme "m" may be taken out from each sound "ma", "mi" or "mu" and learning may be carried out thereabout. Learning about each phoneme connected to any of various other phonemes can be carried out, thus improving the recognition rate.

Figure 8:
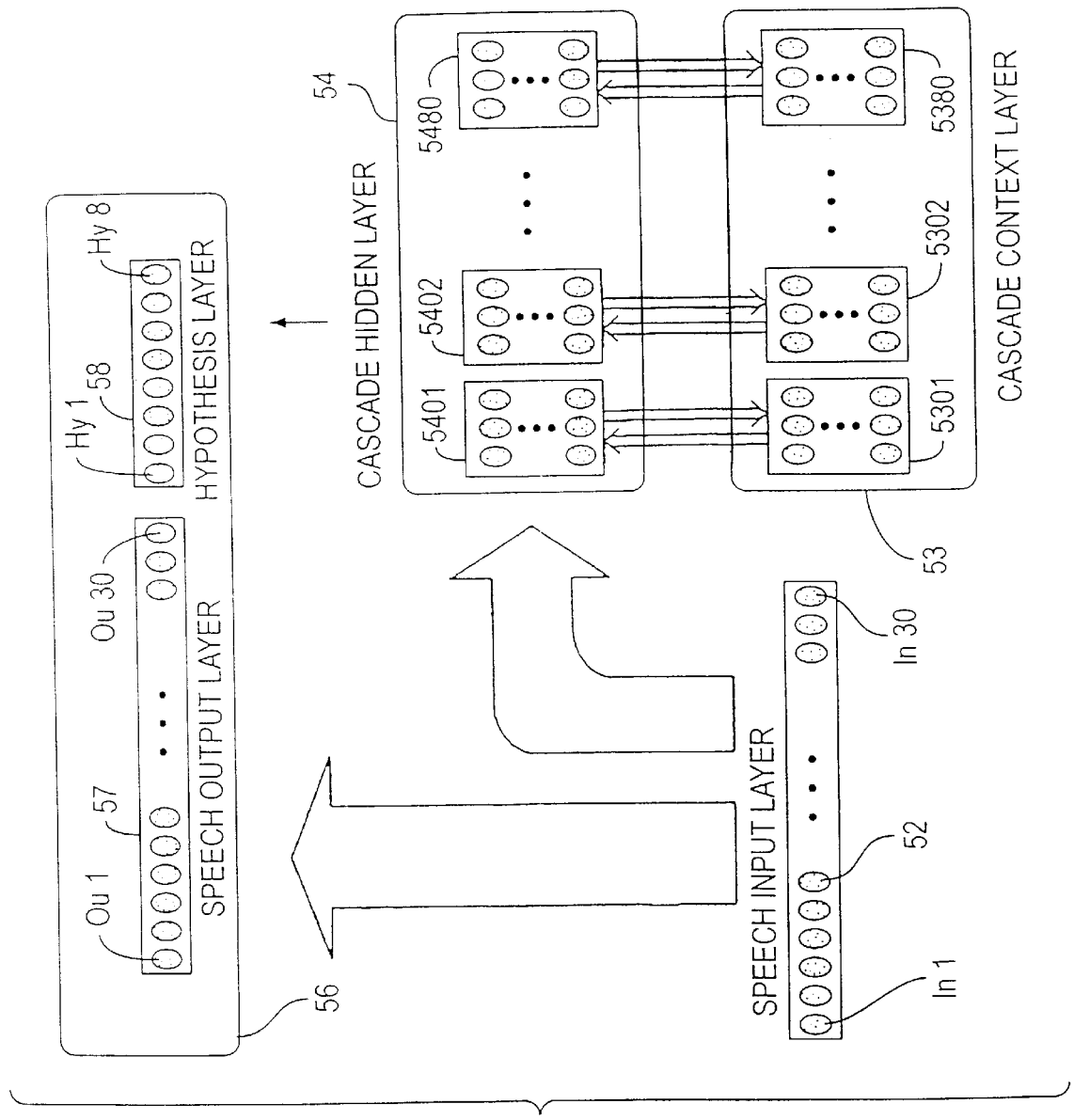
FIG. 8 is a diagram showing the structure of another example of a neuron device network in the speech recognition apparatus of the present invention.

FIG. 8 illustrates the structure of the neuron device network according to a second example of the present invention of the first embodiment.

As shown in FIG. 8, the neuron device network comprises a recurrent cascade type neural network in the second example of this embodiment.

The recurrent cascade type neuron device network is provided with a speech input layer 52 and an output layer 56 which has a speech output layer 57 and a hypothesis layer 58. Each of the neuron devices In1 to In30 of speech input layer 52 is connected to each of the neuron devices Ou1 to Ou30 of the output layer 56. This type of connection of the neuron devices is a complete connection.

Further, the neuron device network is provided with a cascade hidden layer 54 consisting of 80 hidden layers 5401 to 5480 corresponding to all of the phonemes, and a cascade context layer 53 consisting of 80 context layers 5301 to 5380 corresponding to the respective hidden layers 5401 to 5480 of the cascade hidden layer 54. Each of the hidden layers 5401 to 5480 has a different number of neuron devices in accordance with the corresponding number of phonemes. Each of the context layers 5301 to 5380 is provided with the same number of neuron devices as that of the corresponding hidden layers 5401 to 5480.

In this example, each of the speech input layer 52 and the speech output layer 57 has 30 neuron devices, and the hypothesis layer 58 has 8 neuron devices. However, similar to the embodiment shown in FIG. 2, the number of neuron devices may be any other number so long as the number of neuron devices of the speech input layer 52 equals that of the neuron devices in the speech output layer 57.

The connection between the hidden layers of cascade hidden layer 54 and the hidden layers of cascade context layer 53 is not a complete connection. The respective hidden layers 5401 to 5480 are connected only with their corresponding cascade context layers 5301 to 5380. That is, the hidden layer 5401 is connected with the corresponding cascade context layer 5301 but not completely connected with other context layers 5302 to 5380. Similarly, other hidden devices 5402 to 5480 are connected with only the corresponding context layers.

Further, the cascade hidden layer 54 is completely connected with both the speech input layer 52 and the output layer 56.

Note that the neuron devices constituting the respective hidden layers 5401 to 5480 are independent from each other in this embodiment. However, any adjacent neuron device may be connected with another adjacent neuron device in order to input an output of one neuron device to another neuron device.

In the neuron device network having such a configuration, the vector rows of the speech obtained at time t which have been subjected to spectral analysis by the FFT unit 21 during learning are sequentially input to the speech input layer 52. The vector states of the hidden layers 5401 to 5480, which are obtained after learning at previous time t−1 is completed, are input to the respective context layers 5301 to 5380. The vector rows at time t+1, which are to be subsequently supplied to the speech input layer 52, are input to the speech output layer 57 as the first instructor signals.

The second instructor signals are input to the hypothesis layer 58, as code rows hypothesizing phonemes represented by the vector rows which are input to the speech input layer 52 at intervals of time before and after time t.

For example, when learning a phoneme "a", learning is carried out by varying only connection weights between the hidden layer 5401 and the output layer 56, the hidden layer 5401 and the context layer 5301, the hidden layer 5401 and the speech input layer 52, and the speech input layer 52 and the output layer 56. That is, the connection weights are not varied between the hidden layers 5402 to 5480 and the speech input layer 52, the hidden layers 5402 to 5480 and the context layers 5302 to 5380, and the hidden layers 5402 to 5480 and the output layer 56.

When learning a next phoneme "i", the connection weights between the hidden layer 5401 and the respective layers are fixed. Further, an output from the hidden layer 5401 whose connection weights are fixed, as well as an output from the hidden layer 5402 corresponding with the phoneme "i", is input to the output layer 56 during the learning process associated with the phoneme "i". Output values of the output layer 56 obtained in response to this set of inputs are compared with values of the instructor signals and learned.

In this manner, the output from the hidden layer 5401, whose connection weights are fixed, is regarded as noise when learning the phoneme "i". However, learning of the connection weights of the hidden layer 5402, during which the noise is eliminated, is carried out by using the noise associated with the learning of the next phoneme "i".

Similarly, when learning the next phoneme "u", outputs from the hidden layers 5401 to 5402 corresponding with the determined phonemes "a" and "i" are input to the output layer 56. The connection weight of these two layers 5401 and 5402 is fixed.

In the recurrent cascade type neuron device network having above-described configuration, since a pair in each of the hidden layer and the context layer are provided for each phoneme and completely separated from other hidden layers or context layers, each phoneme can be learned at high speed.

As a variation of this embodiment, the learning process of the hidden layer and the context layer pair corresponding with each phoneme may be independently carried out by using a separate computer system or the like, and the cascade hidden layer and the cascade context layer may be designed by combining pairs of the hidden layer and the context layer after completion of each learning cycle.

In this case, since each hidden layer independently learns about only its corresponding phoneme, learning during which the noise is eliminated from the hidden layers corresponding with other phonemes cannot be performed. Thus, an additional hidden layer is provided by which a signal for eliminating the noise of each phoneme is input to the output layer 56. Further, learning about all the phonemes is again performed with the connection weights of the respective hidden layers 5401 to 5480 which have been already learned and fixed.

In this case, an output from an additionally-provided hidden layer is a value for eliminating the noise. For example, when the learning process related to the phoneme "a" is carried out again, the connection weights of the additional hidden layer are learned, so that a value of the total of outputs from the hidden layers 5402 to 5480 whose connection weights are fixed, is 0.

Although the cascade context layer 53 is provided to the neuron device network shown in FIG. 8, the neuron device network may not have the cascade context layer 53. In this case, the respective neuron devices constituting the hidden layers 5401 to 5480 of the cascade hidden layer 54 are configured to feed-back their values as inputs thereto. In other words, when processing the inputs obtained at time t, the values at time t−1 of the neuron devices, as well as the inputs at time t supplied from the speech input layer 52, are fed back and input to the neuron devices of the respective hidden layers.

According to this embodiment, since calculation of the connection weights between the cascade context layer 53 and the cascade hidden layer 54 is unnecessary while taking the information of the past (time t−1) into consideration, the processing speed can be improved.

In the neuron device network shown in FIGS. 2 and 8 and variations thereof, description has been set forth where the connection made between the respective layers is a complete connection, but the present invention is not restricted to this configuration. For example, the connection state may be determined in accordance with a number of neuron devices or a learning ability of each layer.

A second embodiment according to the present invention will now be described.

In the first embodiment, the spectral data analyzed by the FFT 21 are data to be input to the speech input layer 32, whereas cepstrum data are input to the speech input layer 32 to perform speech recognition according to the second embodiment.

Figure 9:
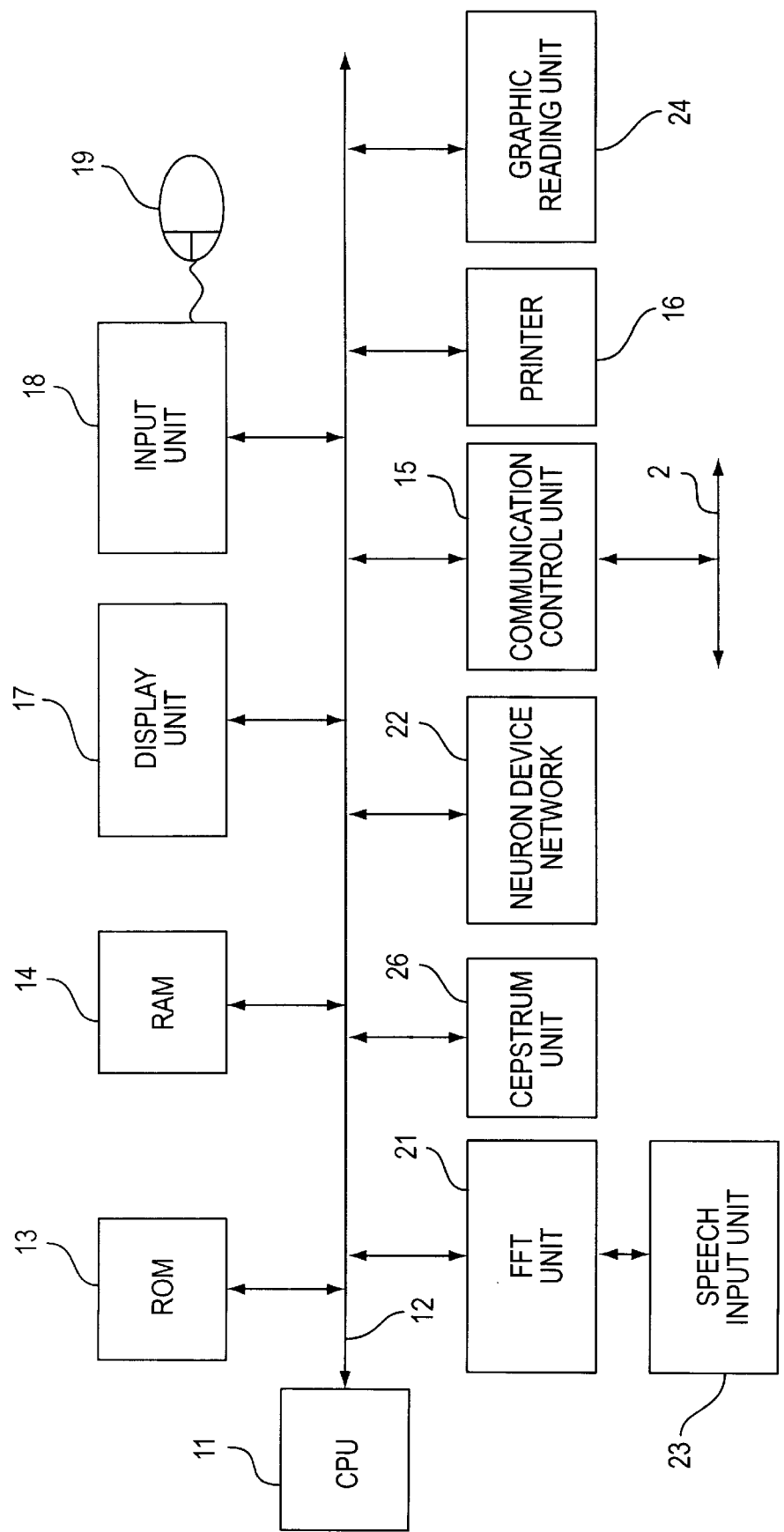
FIG. 9 is a schematic block diagram showing the system structure of a neural network according to a second embodiment of the present invention.

FIG. 9 shows a system schematic block diagram of a neural network according to the second embodiment. As shown in the drawing, a cepstrum unit 26 is additionally provided to the phoneme recognition system according to the first embodiment in this neural network.

Since other parts of this neural network are similar to those in the first embodiment, like reference numerals are used to reference these parts, thereby omitting explanation thereabout. Further, with regard to the neuron device network 22, it may be possible to adopt not only the neuron network described in connection with FIG. 2 of the first embodiment, but also any of various neuron device networks 22 explained as examples and variations of the first embodiment.

Furthermore, when explaining the second and third embodiments hereinafter, each part of the neuron device network 22 is specified with the same reference numerals used in explanation of the neuron network shown in FIGS. 2 and 8. Note that in the case of the speech input layer 32, for example, the reference numeral used thereto denotes both the speech input layer 32 in the neuron network 22 in FIG. 2 and the speech input layer 52 in the neuron device network in FIG. 8.

The cepstrum unit 26 obtains cepstrum data by subjecting a logarithm of a short-time amplitude spectrum of a waveform which has been spectral-analyzed by the FFT unit 21 to inverse Fourier transformation. A spectral envelope and a fine structure can be separated and extracted by the cepstrum unit 26.

A description will now be given as to the principle of the cepstrum.

Assuming that Fourier-transforms of impulse responses from the sound source and path are represented by $G(\omega)$ and $H(\omega)$, respectively, the following relation can be obtained by a linear separate transparent circuit model:

$$X(\omega)=G(\omega) \times H(\omega)$$

When taking logarithms on the both sides of this equation, the following expression (1) can be obtained:

$$\log|X(\omega)|=\log|G(\omega)|+\log|H(\omega)| \qquad (1)$$

Further, when taking inverse Fourier transforms of the both sides of this expression (1), the following expression (2), i.e., the cepstrum can be obtained:

$$c(\tau)=F^{-1}\log|X(\omega)|$$
$$=F^{-1}\log|G(\omega)|+F^{-1}\log|H(\omega)| \qquad (2)$$

Here, a dimension of $\tau$ is time because it is an inverse transform obtained from the frequency domain, and it is called a quefrency.

Extraction of a basis cycle and an envelope will now be explained.

A first term on the right side of the expression (1) represents a fine structure of the spectrum, while a second term on the right side is a spectral envelope. The inverse Fourier transforms of the both terms largely differ from each other, and the first term represents a peak of the high quefrency, while the second term is concentrated on a low quefrency portion of approximately 0 to 4 ms.

The logarithmic spectral envelope can be obtained by Fourier-transforming all parts other than the high quefrency part, and the spectral envelope can be obtained by exponential-transforming that result.

The degree of smoothness of the obtained spectral envelope varies depending on the quantity of components of the low quefrency portion to be used. The operation for separating quefrency components is called "liftering".

Figure 10:
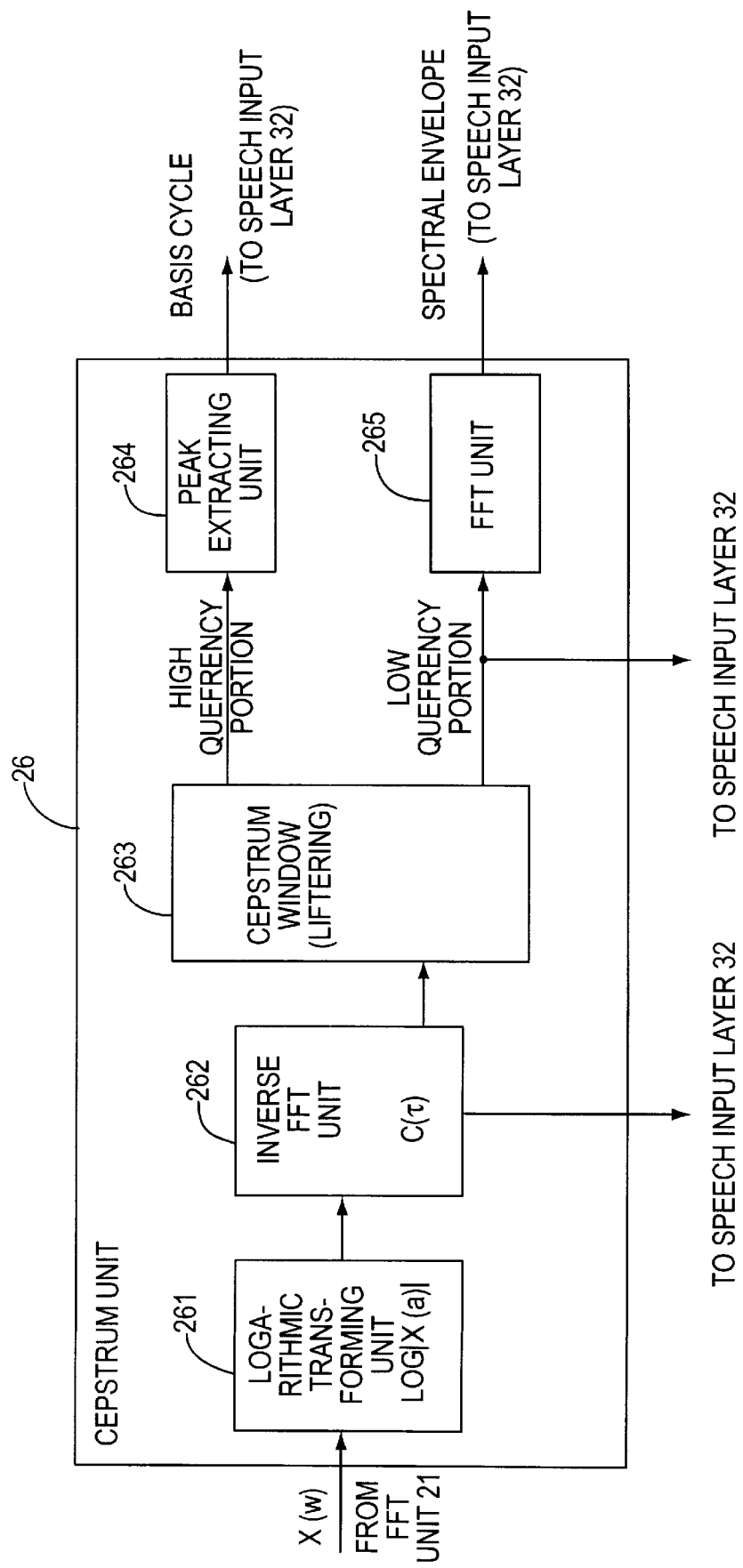
FIG. 10 is a diagram showing the structure of a cepstrum unit in the second embodiment.

FIG. 10 illustrates the schematic structure of the cepstrum unit 26.

The cepstrum unit 26 is provided with a logarithmic transforming unit 261, an inverse FFT unit 262, a cepstrum window 263, a peak extracting unit 264 and an FFT unit 265.

The cepstrum window 263, the peak extracting unit 264 and the FFT unit 265 are not required when cepstrum data obtained by the inverse FFT unit 262 are used as data to be supplied to the speech input layer 32 (52) of the neuron device network 22, but they are required when the spectral envelopes are used as input data of the neuron device network 22. Thus, there are several possible configurations of cepstrum unit 26. The configuration of the cepstrum unit 26 will determine the connection of the cepstrum unit 26 to the speech input layer 32 (52). The various connections of the cepstrum unit 26 to the speech input layer 32 (52) are shown in FIG. 10.

Further, the FFT unit 265 is not necessarily required and it may be substituted by the FFT unit 21.

The logarithmic transformation unit 261 performs a logarithmic transformation of the spectral data $X(\omega)$ supplied from the FFT 21 in accordance with the expression (1) to obtain $Log|X(\omega)|$ and supplies the result to the inverse FFT unit 262.

The inverse FFT unit 262 takes the inverse FFT from the supplied value and calculates $c(\tau)$ to obtain cepstrum data. The inverse FFT unit 262 outputs the obtained cepstrum data as input data In to the speech input layer 32 of the neuron device network 22, as described in the first embodiment, with which learning about the speech data or speech recognition is carried out. A number of input data In input to the neuron device network 22, is the same number of the neuron devices of the speech input layer 32, which has been arbitrarily selected in accordance with speech recognition. That is, in the case of the neuron device network 22 shown in FIG. 2, since a number of neuron devices of the speech input layer 32 is 30, the quefrency ($\tau$) axis is divided in 30, and values of the power for respective quefrencies are supplied as input data of the neuron devices In1 to In30 to the speech input layer 32 (52).

In a first example of the second embodiment, the cepstrum data obtained by the inverse FFT portion 262 are supplied to the speech input layer 32.

A second example of the second embodiment will now be described.

In the second example, quefrency components are separated into the high quefrency portions and the low quefrency portions by littering the cepstrum data obtained in the cepstrum window 263.

The separated low quefrency portion is subjected to Fourier transformation in the FFT unit 265 to obtain the logarithmic spectral envelope. Further, it is exponential-transformed to calculate the spectral envelope. On the basis of the spectral envelope data, the frequency axis is divided into a number equal to that of the neuron devices, and a value of the power for each frequency is input to the speech input layer 32 (52).

Note that the cepstrum data of the low quefrency portion which has been separated in the cepstrum window 263 may be supplied as the input data to the speech input layer 32.

The basis cycle is extracted from the cepstrum data of the separated high quefrency portion by the peak extracting unit 264, and the extracted cycle may be used as one of the input data together with the data of the spectral envelope obtained by the FFT unit 265. In this case, if a number of neuron devices in the speech input layer 32 is N, (N–1) input data In1 to In(N–1) from the data of the spectral envelope are input to the speech input layer 32, and the input data InN from data of the basic cycle are input to the speech input layer 32 (52).

As mentioned above, according to the second embodiment, since the input data which have additional speech characteristics than the power spectrum are a target of recognition by using the cepstrum data related to the speech data, the rate of recognition can be further improved.

Although description has been given as to speech recognition in the second embodiment, image recognition may be performed by using cepstrum data of image data. In this case, either the image data read by the graphic reading unit 24 or the image data received by the communication control unit 15 may be used as the image data.

A third embodiment according to the present invention will now be explained.

As described above, the cepstrum data are used as input data supplied to the speech input layer 32 (52), of the neuron device network 22 in the second embodiment, whereas data of the hidden layer in an auto-associative neural network are used as the input data in the third embodiment.

Figure 11:
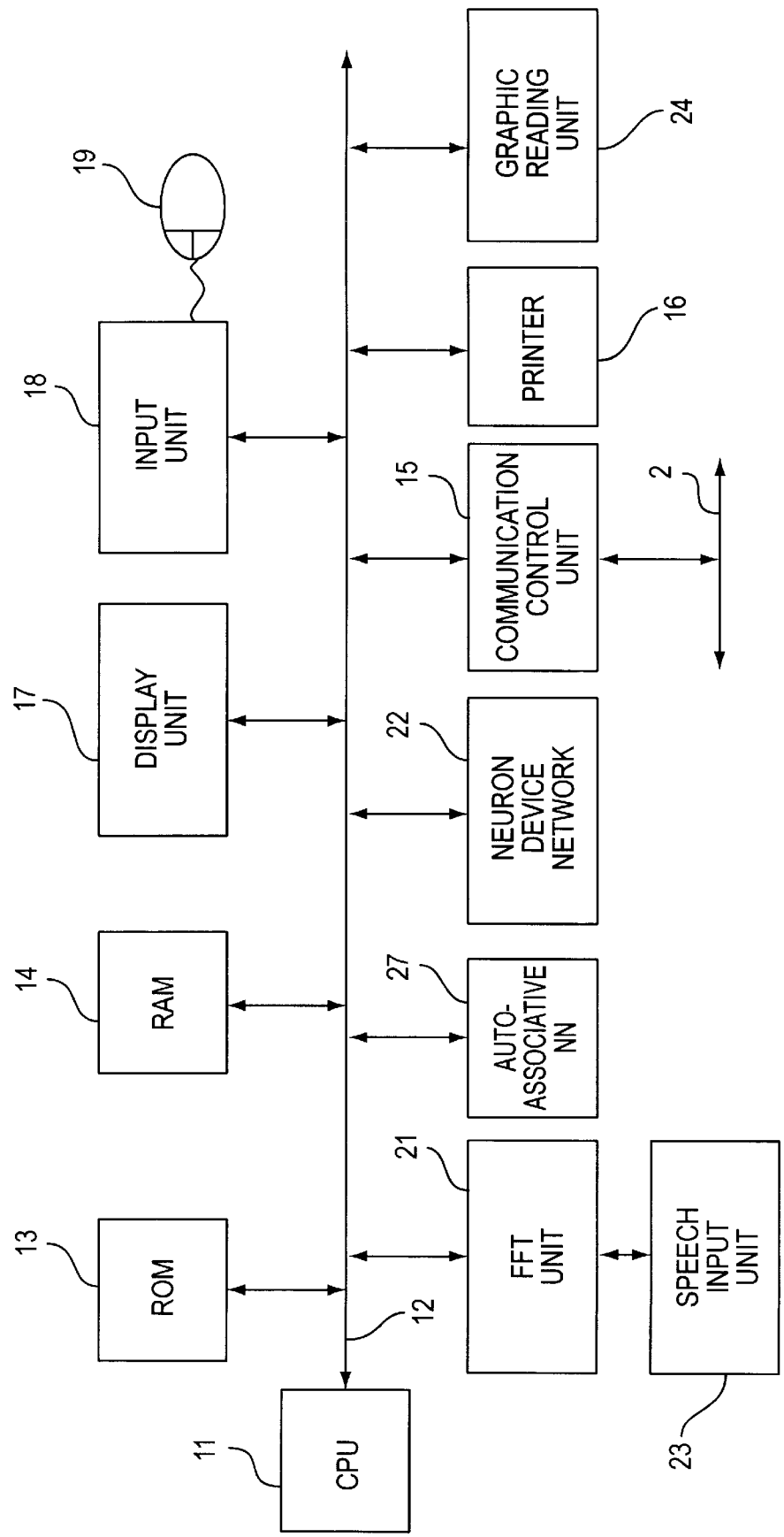
FIG. 11 is a diagram showing the system structure of a neural network used according to a third embodiment of the present invention.

FIG. 11 illustrates, in block diagram fashion, the system structure of the neural network using the auto-associative NN (neural network) 27 in the third embodiment. As shown in the drawing, an auto-associative neural network 27 is additionally provided to the system of the first embodiment in this neural network.

An area for storing vector rows for the auto-associative neural network, as well as the vector row storing area for storing the input data for the neuron device network 22, is located in the RAM 14 according to the third embodiment.

Since other parts of this network are similar to those of the first embodiment, like reference numerals are used to represent these parts, thereby omitting explanation thereabout. Further, as the neuron device network 22, it may be possible to adopt not only the neuron device network 22 in accordance with the first embodiment, but also any of various neuron device networks 22 which have been described as examples or variations of the first embodiment.

A number of neuron devices In of the speech input layer 32 in the neuron device network 22 according to the third embodiment is equal to the number neuron devices of the hidden layer AH in the auto-associative neural network 27.

Figure 12:
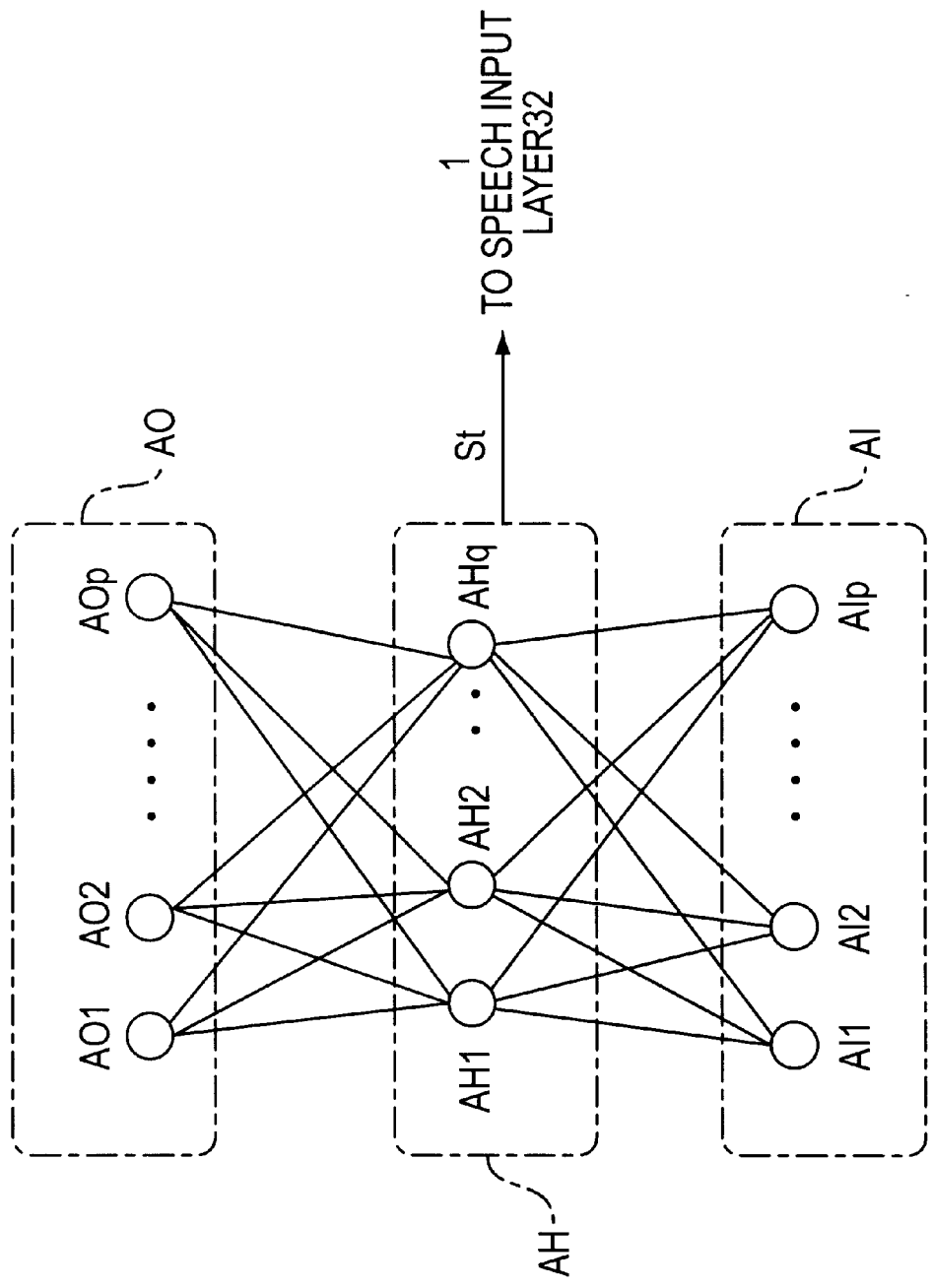
FIG. 12 is a diagram showing the structure of the auto-associative neural network according to the third embodiment.

FIG. 12 illustrates the structure of the auto-associative neural network 27.

As shown in FIG. 12, the auto-associative neural network 27 is provided with three layers, i.e., an input layer AI, a hidden layer AH, and an output layer AO.

The input layer AI is provided with p neuron devices AI1 to AIp, the number p being equal to p input data which are arbitrarily selected in accordance with various types of processing, such as speech recognition or graphic recognition.

The hidden layer AH is provided with q neuron devices AH1 to AHq, the number q being smaller than the number p (i.e., q<p) of neuron devices of the input layer AH.

The output layer AO is provided with p neuron devices AO1 to AOp, the number p being equal to the number p of neuron devices of the input layer AH.

The respective neuron devices AH1 to AHq of the hidden layer AH are completely connected with all the neuron devices of the input layer AI by connection weights AW11 to AWpq which can be changed during learning.

Further, the respective neuron devices AH1 to AHq of the hidden layer AH have threshold values which can be changed during the learning process.

The neuron devices AH1 to AHq of the hidden layer AH supply output values by forward-propagation based on input data fed to the input layer AI, the connection weights AW and the threshold values. The output values from the AH1 to AHq are output as input data St supplied to the speech input layer 32 of the neuron device network 22.

Furthermore, the neuron devices AO1 to AOp of the output layer AO are completely connected with all the neuron devices AH1 to AHq of the hidden layer AH with connection weights Aw11 to Awq which can be changed during the learning process as described above. Also, the respective neuron devices AO1 to AOp supply output values of the auto-associative neural network 27 based on the output value St of the hidden layer AH and the connection weights Aw.

The auto-associative neural network 27 is provided with a memory (not shown) for storing the connection weights AW between the input layer AI and the hidden layer AH, and the threshold values and the connection weights between the hidden layer AH and the output layer AO.

A description will now be presented regarding generating the input data St, which are input to the neuron device network 22 by the auto-associative neural network 27 when performing, e.g., speech recognition.

A process of learning about a phoneme "a" among respective phonemes which are the target of the speech recognition process will be explained.

As to the phoneme "a" which is the target of learning, it is assumed that a phoneme which is uttered at the beginning of a word is represented by "あ"; a phoneme which is uttered at the end of the word is represented by "ア"; and a phoneme which is uttered in the middle of the word is represented by "A". For example, "あ" is taken from a word "aki" (autumn); "ア" is taken from a word "denwa" (telephone); and "A" is taken from a word "tomari" (stay). In regard to the phoneme "a", explanation will be given as to the example where learning about three patterns of the phoneme "a", i.e. "あ", "ア," and "A" is carried out. However, the present invention is not limited to this number of patterns. Thus, learning 3 to 30 patterns of each phoneme, or more preferably, approximately 100 patterns of each phoneme may be carried out.

Figure 13A:
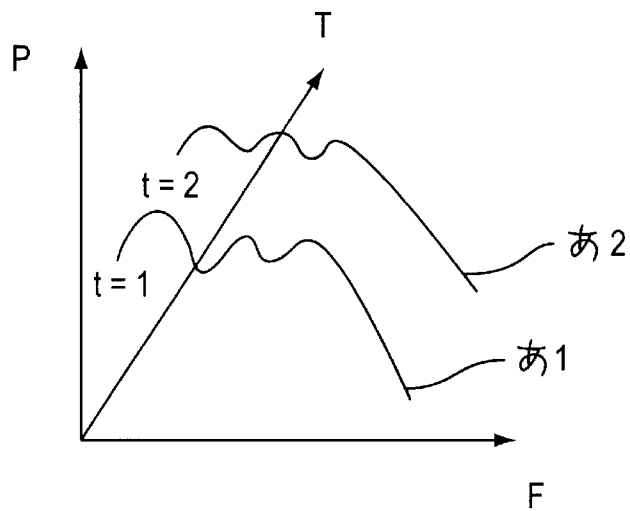
FIGS. 13A, 13B and 13C are graphs showing data obtained by spectral-analyzing the terms "あ", "ア" and "A" according to the third embodiment.
Figure 13B:
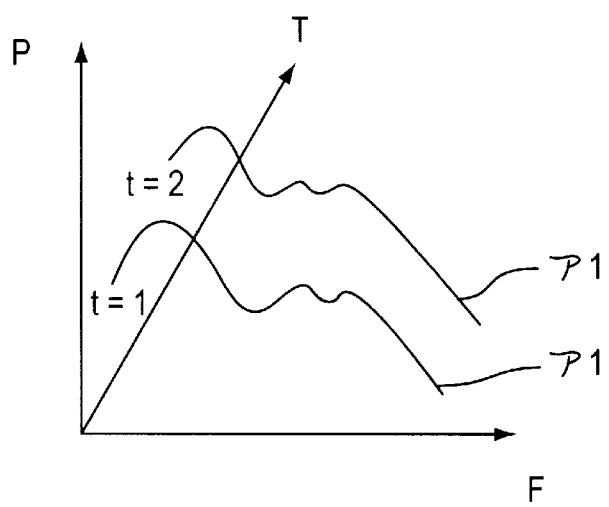
Figure 13C:
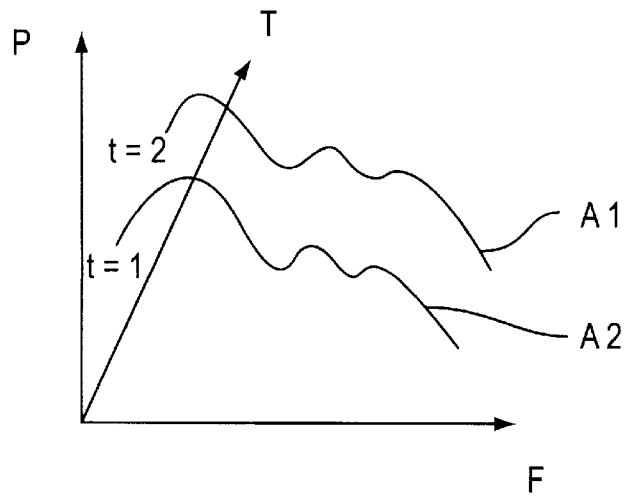

FIGS. 13A, 13B and 13C represent data obtained by spectral-analyzing the three patterns "あ", "ア" and "A" in FFT process by the FFT unit 21 at each time point t (t=1, 2, . . . , n).

As shown in FIGS. 13A, 13B and 13C, the FFT unit 21 calculates values of power (P) of the speech data with respect to each frequency at each time t (the divided number of frequencies in accordance with a number p of neuron devices of the input layer AI which corresponds to p of F1 to Fp). In this manner, similar to the first embodiment explained above in connection with FIG. 6, the vector rows based on the power P(t) relative to the respective frequencies are stored in the auto-associative neural network 27 vector row storing area of the RAM 14 at each of the respective time points.

As shown in FIG. 13A, it is assumed that the vector row of the power P(1) at time t=1, which is obtained by spectral-analyzing the phoneme "あ" is represented as あ1, the vector row of the power P(2) at time t=2 is represented as あ2 and, although not shown, the vector row at time t=n is represented as あn.

Further, as shown in FIG. 13B, it is assumed that the vector row of the power P(1) at time t=1 which is obtained by spectral-analyzing the phoneme "ア" is represented as ア1, the vector row of the power P(2) at time t=2 is represented as ア2 and, although not shown, the vector row at time t=n is represented as アn.

Furthermore, as shown in FIG. 13C, it is assumed that the vector row of the power P(1) at time t=1 which is obtained by spectral-analyzing the phoneme "A" is represented as A1, the vector row of the power P(2) at time t=2 is represented as A2 and, although not shown, the vector row at time t=n is represented as An.

Learning in the auto-associative neural network 27 and generation of input data supplied to the input layer IN of the neuron device network 22 are executed at each time point of the power P(t) and are obtained by spectral-analyzing each phoneme.

In other words, learning is carried out in accordance with each vector row at each time point t by supplying the vector rows あ1, ア1 and A1 of the respective phonemes at the same time, e.g., t=1 as the input data to the input layer AI of the auto-associative neural network 27, and using the vector rows as instructor signals of the output layer AO. Once the output value St from the hidden layer AH is obtained when learning at time t is completed, it is treated as the input data to the input layer IN.

Note that various kinds of learning according to, e.g., back-propagation are adaptable as learning in the auto-associative neural network 27.

FIG. 14 shows input data and instructor signals during the learning process in the auto-associative neural network 27 and output values St after learning in the same. FIG. 14 illustrates as an example, the case where learning is carried out based on vector rows of the power for the respective phonemes shown in FIG. 13.

As shown in FIG. 14, learning is performed at each time point t (t=1, 2, . . . , n) as a unit, and the input data St are generated. For example, at the time point t1, learning about the input data あ1, ア1 and A1 is performed with the instructor signal as あ1, and learning about the input data あ1, ア1 and A1 is then performed with the instructor signal ア1. Thereafter, learning about the input data あ1, ア1 and A1 is carried out with the instructor signal A1.

Upon completion of the learning about all of the combinations of these data, any of data あ1, ア1 or A1 is input to the input layer A1, and the input data S1 at time t=1 which is to be supplied to the speech input layer 32 of the neuron device network 22 is produced from the current output value of the hidden layer AH.

Similarly, the input data S2 at time t=1 which are to be input to the speech input layer 32 are generated after learning about all the combinations of the input data based on あ2, ア2 and A2 with each of the instructor signals at time t=2. Data S3, S4, . . . , Sn are similarly produced.

The learning process is carried out by the neuron device network 22 in accordance with the input data St (t=1, 2, . . . , n) generated by the auto-associative neural network 27.

In the case of the neuron device network 22 according to the first embodiment, the input data St are input to the speech input layer 32 and the speech output layer Ou. In other words, when learning about the spectral data at time t=i is performed, the vector row of the input data Si is input to the speech input layer 32, and the vector row of the input data S(i+1) is input as the instructor signal to the speech output layer Ou.

Input of the instructor signal (the code row representing the phoneme for generating the input data St) to the hypothesis layer 38 is performed in a manner similar to that in the first embodiment.

When learning in the auto-associative neural network 27 and the neuron device network 22 is completed according to this manner, the actual speech recognition is carried out as follows.

When a sound, which is a target of recognition, is first input from the speech input unit 23, spectral analysis is carried out in the FFT unit 21, and the vector rows of the powers P(t) relative to respective frequencies at the respective time points t are time-sequentially obtained. The vector rows are stored in the auto-associative neural network 27 vector row storing area in the RAM 14 at predetermined intervals of time.

The CPU 11 successively inputs the vector rows P(t) obtained, after spectral analysis of the sound by the FFT unit 21 is completed, to the input layer AI of the auto-associative neural network 27. The auto-associative neural network 27 supplies output vectors of the hidden layer AH, which correspond with the input vector rows P(t), to the neuron device network 22 as the input data St at time t.

In the case of the neuron device network 22 according to the first embodiment, the input data S(t) at each time t (t=1, 2, . . . , n) are sequentially input to the speech input layer 32. An output value corresponding to each input data is input from each neuron device of the hypothesis layer 38 in the neuron device network 22 according to the first embodiment.

Further, the CPU 11 specifies the corresponding phoneme by collating output values from the respective neuron devices with the code rows of the second instructor signals stored in the ROM 13, and stores the phoneme in the RAM 14.

As described in connection with the first embodiment, since each of the stored phonemes is analyzed into a plurality of vector rows P(tn) and input to the speech input layer 32 in time series to be specified, a plurality of phoneme rows are obtained. That is, if a phoneme "iro" is input, "iiiiirrroooo" is obtained, for example. The CPU 11 therefore recognizes the input speech as "iro" from the phoneme rows stored in the RAM 14.

The CPU 11 then transforms the recognized speech into a writing represented by characters in accordance with the, e.g., Japanese transformation system, and transmits data to various communication units such as a personal computer or a word processor through the communication control unit 5 and the communication network 2.

As mentioned above, the vector rows input to the neuron device network 22 are reduced by using the auto-associative neural network 27 according to the third embodiment, and a number of neuron devices of the speech input layer 32 can be similarly decreased. Thus, the structure of the neuron device network 22 can be made small in scale.

According to the third embodiment mentioned above, since a target of learning in the auto-associative type neural network 27 is all of the combinations of the input data with the instructor signals for each pattern of the phoneme, the hidden layer AH can produce the generalized vector rows St (t=1 to n) of that phoneme.

Additionally, instead of the combinations for each pattern of all the phonemes, the same patterns may be used for the input data of the input layer AI and the instructor signals of the output layer AO.

As an input to the input layer AI of the auto-associative neural network 27 during learning or recognition, the data which have been spectral-analyzed by the FFT unit 21 are used in the above-described third embodiment. On the other hand, the input data St of the neuron device network 22 may be produced by inputting the cepstrum data to the input layer AI of the auto-associative neural network 27.

In the third embodiment mentioned above, when performing speech recognition, the vector rows P(t) which have been spectral-analyzed by the FFT unit 21 are successively input to the input layer AI of the auto-associative neural network 27, and the output vectors from the hidden layer AH are immediately output to the neuron device network 22 as the input data St at time t.

However, the auto-associative neural network 27 may be used as a filter for judging whether recognition of the speech uttered by a speaker is possible by the neuron device network 22 in which learning has been carried out for infinite speakers. In other words, learning for speaker-independent recognition is previously carried out in the auto-associative neural network 27 with respect to a specific keyword using data for infinite or generic speaker which are utilized in learning process of the neuron device network 22.

The speaker then utters and inputs the specific keyword to the speech input unit 23 when performing speech recognition. The input keyword is spectral-analyzed by the FFT unit 21 and input to the input layer AI of the auto-associative neural network 27, and the input data St is generated from the output values of the hidden layer AH. The input data St of the speaker are compared with the data St used when learning was initially carried out for infinite speakers, and if both data are significantly different from each other, it can be judged that recognition of the speech of the speaker by the input neuron device network 22 may not be able to be performed.

It may be possible to judge whether recognition of the speech of the speaker is enabled by inputting spectral data of arbitrary spectral data of the speaker to the auto-associative neural network 27 in which learning of speech of infinite speakers has been already been completed, and comparing the output data from the output layer AO with the input data and judging whether auto-association has been substantially made.

Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

The present disclosure relates to subject matter contained in Japanese Patent Application No. 336135/1994, filed Dec. 22, 1994, and Japanese Patent Application No. 236061/1995, filed Aug. 22, 1995, which are expressly incorporated herein by reference in their entireties.

What is claimed:

1. A learning method of a neural network comprising:
   inputting first vector rows representing data to a data input layer;
   inputting second vector rows as a first instructor signal to a first output layer, the first instructor signal comprising vector rows input to the data input layer at a time after inputting the first vector rows; and
   inputting a definite meaning as a second instructor signal to a second output layer, the second instructor signal being determined in accordance with vector rows input to the data input layer at times before and after the first vector rows are input to the data input layer, and
   performing learning for the data by having a plurality of first vector rows represent the definite meaning.

2. The learning method of a neural network according to claim 1 wherein learning is performed in accordance with error back-propagation.

3. A learning method of a neural network comprising:
   inputting first vector rows representing data to a data input layer;
   inputting second vector rows as a first instructor signal to a first output layer; and
   inputting a definite meaning as a second instructor signal to a second output layer, the definite meaning is phoneme data representing a speech element and the plurality of first vector rows represent characteristics of the definite meaning analyzed in a time series; and
   performing learning for the data by having a plurality of first vector rows represent the definite meaning.

4. A learning method of a neural network according to claim 3, wherein one of spectral data, cepstrum data of the speech, and an output value data of the hidden layer of an auto-associative neural network is used as the plurality of first vectors representing the characteristics of the definite meaning.

5. A learning method of a neural network comprising:

inputting, to a feedback input layer, output vector values of a hidden layer having a plurality of neuron devices, the plurality of neuron devices corresponding to first vector rows of the feedback input layer, the feedback input layer connected with the hidden layer and having a number of neuron devices equal to a number of neuron devices of the hidden layer;

inputting second vector rows representing data to a data input layer;

inputting third vector rows as a first instructor signal to a first output layer, the first instructor signal comprising vector rows input to the data input layer at a time after inputting the first vector rows; and inputting a definite meaning as a second instructor signal to a second output layer, the second instructor signal being determined in accordance with vector rows input to the data input layer at times before and after the first vector rows are input to the data input layer; and performing learning for the data by having a plurality of second vector rows represent the definite meaning.

6. The learning method of a neural network according to claim 5, wherein learning is performed in accordance with error back-propagation.

7. A learning method of a neural network comprising:

inputting to a feedback input layer, output vector values of a hidden layer having a plurality of neuron devices, the plurality of neuron devices corresponding to first vector rows of the feedback input layer, the feedback input layer connected with the hidden layer and having a number of neuron devices equal to a number of neuron devices of the hidden layer;

inputting second vector rows representing data to a data input layer;

inputting third vector rows as a first instructor signal to a first output layer, and inputting a definite meaning as a second instructor signal to a second output layer; and performing learning for the data by having a plurality of second vector rows represent the definite meaning, wherein the definite meaning is phoneme data representing a speech element and the plurality of second vector rows represent characteristics of the definite meaning analyzed in a time series.

8. A learning method of a neural network according to claim 7, wherein one of spectral data, cepstrum data of the speech, and an output value data of the hidden layer of an auto-associative neural network is used as the plurality of second vector rows representing the characteristics of the definite meaning.

9. A learning method of a neural network comprising:

inputting output vector values of a first output layer corresponding to first vector rows of a feedback input layer, the feedback input layer connected to a hidden layer that has neuron devices whose number is equal to that of neuron devices of the first output layer;

inputting second vector rows to a data input layer;

inputting third vector tows as a first instructor signal to the first output layer, the first instructor signal comprising vector rows input to the data input layer at a time after inputting the first vector rows; and inputting a definite meaning as a second instructor signal to a second output layer, the second instructor signal being determined in accordance with vector rows input to the data input layer at times before and after the first vector rows are input to the data input layer, wherein learning is carried out for data having a plurality of the second vector rows representing the definite meaning.

10. A learning method of a neural network according to claim 9, wherein learning is performed in accordance with error back-propagation.

11. A learning method of a neural network comprising:

inputting output vector values of a first output layer corresponding to first vector rows of a feedback input layer, the feedback input layer connected with a hidden layer and having neuron devices whose number is equal to that of neuron devices of the first output layer;

inputting second vector rows to a data input layer;

inputting third vector rows as a first instructor signal to the first output layer; and inputting a definite meaning as a second instructor signal to a second output layer, wherein the definite meaning is phoneme data representing a speech element and the plurality of second vector rows represent characteristics of the definite meaning analyzed in a time series, wherein learning is carried out for data having a plurality of the second vector rows representing the definite meaning.

12. A learning method of a neural network according to claim 11, wherein one of spectral data, cepstrum data of the speech, and an output value data of the hidden layer of an auto-associative neural network is used as the plurality of second vector rows representing the characteristics of the definite meaning.

13. A neural network comprising:

a neuron device network having a data input layer, a hidden layer connected to said data input layer, and an output layer connected to said hidden layer, said output layer comprising a first output layer and a second output layer;

learning means in said neuron device network for learning about data having a plurality of first vector rows representing a definite meaning, said learning means inputting said plurality of first vector rows to said data input layer, inputting second vector rows as a first instructor signal to said first output layer and inputting said definite meaning as a second instructor signal to said second output layer;

inputting means for inputting said plurality of first vector rows to said data input layer of said neuron device network; and outputting means for outputting output signals of said second output layer based on input of said plurality of first vector rows by said inputting means.

14. The neural network according to claim 13, further comprising a plurality of hidden layers at least equal to a number of definite meanings;

wherein said data input layer and said output layer are connected with each other, and values corresponding with said output signals relative to a plurality of third vector rows are fed back and input to respective hidden layers.

15. The neural network according to claim 13, wherein said data input layer, said hidden layer and said second output layer each have connection weights between respective neuron devices.

16. A neural network comprising:

a neuron device network comprising an input layer having a data input layer and a feedback input layer;

a hidden layer connected to said input layer; and an output layer connected to said hidden layer, said output layer having a first output layer and a second output layer;

learning means in said neuron device network for learning about data having a plurality of first vector rows representing a definite meaning by:
  (1) inputting a plurality of second vector values of said hidden layer or said first output layer, to said input layer,
  (2) inputting said plurality of first vector rows to said data input layer of the input layer,
  (3) inputting a plurality of third vector rows as a first instructor signal to said first output layer, and
  (4) inputting said definite meaning as a second instructor signal to said second output layer;

inputting means for inputting said plurality of first vector rows to said data input layer of said neuron device network such that said learning means performs said learning; and outputting means for outputting output signals of said second output layer based on input of said plurality of first vector rows by said inputting means, said input layer having a plurality of neuron devices equal in number to a number of neuron devices of said hidden layer or said first output layer.

17. The neural network according to claim 16, wherein said data input layer, said feedback input layer, said hidden layer and said second output layer each have connection weights between respective neuron devices.

18. A speech recognition apparatus comprising:

a neural network, said neural network including an input layer comprising a speech input layer and a context layer, a hidden layer, and an output layer comprising a speech output layer and a hypothesis layer;

speech inputting means for inputting speech;

analyzing means for analyzing in a time-series, vector rows representing characteristics of the speech input by said speech inputting means;

vector row inputting means for successively inputting said vector rows analyzed by said analyzing means to said input layer of said neural network; and phoneme specifying means for specifying a phoneme in accordance with outputs of said output layer of said neural network by successively inputting said vector rows to said data input layer by said vector row inputting means.

19. The neural network according to claim 18, wherein said analyzing means uses one of spectral data, cepstrum data of the speech, and an output value data of a hidden layer of an auto-associative neural network as said vector rows representing said characteristics of the speech.

\* \* \* \* \*